(12) United States Patent
Huang

(10) Patent No.: US 10,161,955 B2
(45) Date of Patent: Dec. 25, 2018

(54) MULTI-DIRECTIONAL SENSOR

(71) Applicant: Chih-Heng Huang, Taichung (TW)

(72) Inventor: Chih-Heng Huang, Taichung (TW)

( * ) Notice: Subject to any disclaimer, the term of this patent is extended or adjusted under 35 U.S.C. 154(b) by 490 days.

(21) Appl. No.: 14/826,707

(22) Filed: Aug. 14, 2015

(65) Prior Publication Data

US 2016/0265950 A1    Sep. 15, 2016

(30) Foreign Application Priority Data

Mar. 11, 2015  (TW) .............................. 104107786 A

(51) Int. Cl.
| | | |
|---|---|---|
| *G01P 15/135* | (2006.01) | |
| *G01P 15/18* | (2013.01) | |
| *G01P 15/08* | (2006.01) | |
| *H01H 35/14* | (2006.01) | |

(52) U.S. Cl.
CPC ........ *G01P 15/0891* (2013.01); *G01P 15/135* (2013.01); *G01P 15/18* (2013.01); *H01H 35/14* (2013.01)

(58) Field of Classification Search
CPC ..... G01P 15/0891; G01P 15/135; G01P 15/18
USPC .......................................................... 73/431
See application file for complete search history.

(56) References Cited

U.S. PATENT DOCUMENTS

| | | | | |
|---|---|---|---|---|
| 4,948,929 A | * | 8/1990 | Fukushima | ......... G01P 15/0891 200/61.45 M |
| 5,248,861 A | * | 9/1993 | Kato | .................... H01H 35/147 200/61.45 M |
| 5,597,066 A | | 1/1997 | Burmester | |
| 5,756,948 A | * | 5/1998 | Husby | ..................... H01H 35/14 200/61.53 |
| 5,845,730 A | * | 12/1998 | Thuen | ..................... H01H 35/14 180/282 |
| 6,087,936 A | | 7/2000 | Woods | |

FOREIGN PATENT DOCUMENTS

| | | | |
|---|---|---|---|
| CN | 1779878 A | * | 5/2006 |
| CN | 201773111 U | | 3/2011 |
| CN | 103794403 A | | 5/2014 |

(Continued)

OTHER PUBLICATIONS

Search Report appended to an Office Action issued to Chinese counterpart application No. 201510144382.X by the SIPO dated Aug. 30, 2017, with an English translation thereof.

(Continued)

*Primary Examiner* — Lisa Caputo
*Assistant Examiner* — Jamel Williams
(74) *Attorney, Agent, or Firm* — Trop, Pruner & Hu, P.C.

(57) ABSTRACT

A multi-directional sensor includes a housing unit having a surrounding wall that defines a housing space, a first magnetic component disposed on the housing unit, a conductive body disposed in the housing space and magnetically attracted to the first magnetic component, and a plurality of spaced-apart electrically conductive terminals surrounding the conductive body. When the multi-directional sensor is subjected to an impact, the conductive body is forced to move toward two adjacent conductive terminals which are opposite to the direction of impact due to inertia so as to bridge and electrically interconnect the two adjacent conductive terminals so that a signal can be generated.

1 Claim, 24 Drawing Sheets

(56) References Cited

FOREIGN PATENT DOCUMENTS

| | | | |
|---|---|---|---|
| CN | 204464170 U | 7/2015 | |
| EP | 1898438 A1 * | 3/2008 | ............. H01H 35/14 |
| TW | I416081 | 11/2013 | |

OTHER PUBLICATIONS

Search Report appended to an Office Action issued to Taiwanese counterpart application No. 104107786 by the TIPO dated Jul. 1, 2016, with an English translation thereof.

\* cited by examiner

MULTI-DIRECTIONAL SENSOR

CROSS-REFERENCE TO RELATED APPLICATION

This application claims priority of Taiwanese Application No. 104107786, filed on Mar. 11, 2015.

FIELD

The disclosure relates to a sensor, more particularly to a multi-directional sensor.

BACKGROUND

A conventional collision sensing technique is disclosed in an impulse sensor of U.S. Pat. No. 4,948,929. The impulse sensor includes two contact terminals disposed in a case body filled with magnetic fluid, a conductive body held floating in the magnetic fluid, and two magnetic components disposed on two opposite outer sides of the case body. In a normal situation, the conductive weight is held floating in the magnetic fluid at the center of the case body. When the impulse sensor is subjected to an impact, the conductive weight is forced to move toward the contact terminals due to inertia so as to electrically interconnect the contact terminals, so that an impact signal can be generated. However, the impulse sensor can only detect impact from a single direction. If the impact does not take place at the predetermined direction, the impulse sensor cannot detect the impact.

Referring to FIGS. 1 and 2, another conventional collision sensing technique is disclosed in an eight-directional induction starting device for a collision sensor of Chinese Patent Publication No. CN102074411A. The eight-directional induction starting device includes an inner magnetic ring 11, an outer magnetic ring 12, two bearings 13 respectively disposed above and beneath the inner magnetic ring 11, an insulating housing 14 surrounding the inner and outer magnetic rings 11, 12 and the bearings 13, and two conductive cover plates 15 respectively disposed above and beneath the insulating housing 14.

By electrically connecting the inner and outer magnetic rings 11, 12 to different electric potentials, when the eight-directional induction starting device is subjected to an impact, the inner magnetic ring 11 is forced to move toward the outer magnetic ring 12 so as to contact and electrically connect with the same, so that an impact signal can be generated.

However, the eight-directional induction starting device can only detect whether an impact has occurred, but not the direction of impact. Furthermore, in order to enhance the sensitivity of the device, the bearings 13 are disposed above and beneath the inner magnetic ring 11 to reduce friction during sliding movement of the inner magnetic ring 11, so that the overall structure of the device is complicated. Moreover, in order to maintain the inner magnetic ring 11 in an electrical connection state, the bearings 13 and the cover plates 15 must be made of electrically conductive materials. This enhances the risk of electric shock.

Referring to FIGS. 3 and 4, a conventional tilt sensor, as disclosed in Japanese Patent Publication No. JP2009117137, includes a first housing 16, a movable contact 17, two fixed contacts 18, two fixed contacts 20, and a second housing 19. When tilted, the movable contact 17 moves to contact one of the fixed contacts 18 and a corresponding one of the fixed contacts 20 to electrically interconnect the two and generate a signal. With the fixed contacts 18, 20 being disposed transversely of each other, an inclination state of the tilt sensor and impact from four directions can be detected. However, when the impact only takes place along a horizontal direction but not along a top-bottom direction, the movable contact 17 cannot be moved to contact one of the fixed contacts 18 and a corresponding fixed contact 20, so that the tilt sensor cannot detect the direction of impact.

SUMMARY

Therefore, an object of this disclosure is to provide a multi-directional sensor that can alleviate at least one of the drawbacks of the prior arts.

According to one aspect of this disclosure, a multi-directional sensor comprises a housing unit, a first magnetic component, a conductive body and a plurality of spaced-apart electrically conductive terminals. The housing unit includes a surrounding wall surrounding an axis and defining a housing space. The first magnetic component is disposed on the housing unit. The conductive body is made of an electrically magnetically conductive material, is disposed in the housing space, and is magnetically attracted to the first magnetic component. The conductive terminals surround the axis and the conductive body and face the housing space.

According to another aspect of this disclosure, a multi-directional sensor comprises a housing unit, a first magnetic component, a conductive body and a plurality of spaced-apart electrically conductive terminals. The housing unit includes a surrounding wall surrounding an axis, and a cover body cooperating with the surrounding wall to define a housing space. The first magnetic component is disposed on the cover body. The conductive body is made of an electrically magnetically conductive material, is disposed in the housing space, and is magnetically attracted to the first magnetic component. The conductive terminals extend into the housing unit and surround the axis.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
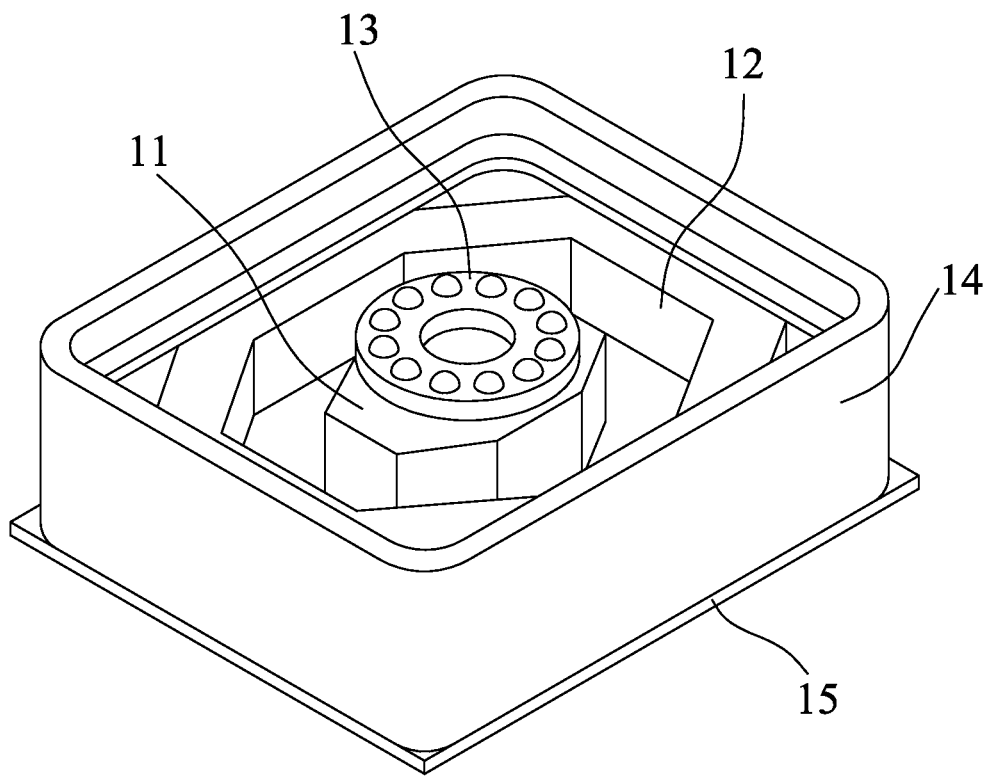
FIG. 1 is a perspective view of an eight-directional induction starting device disclosed in Chinese Patent Publication No. CN102074411A.
Figure 2:
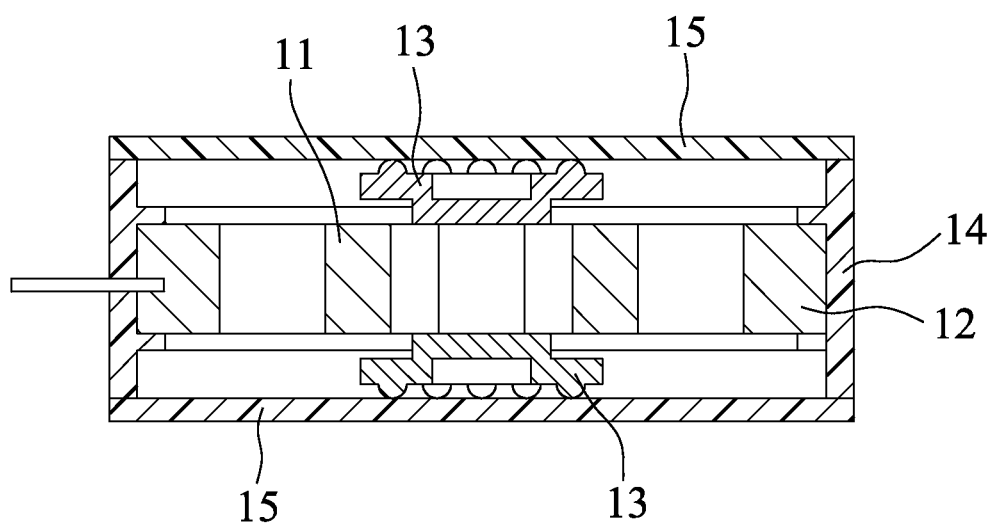
FIG. 2 is a sectional view of FIG. 1.
Figure 3:
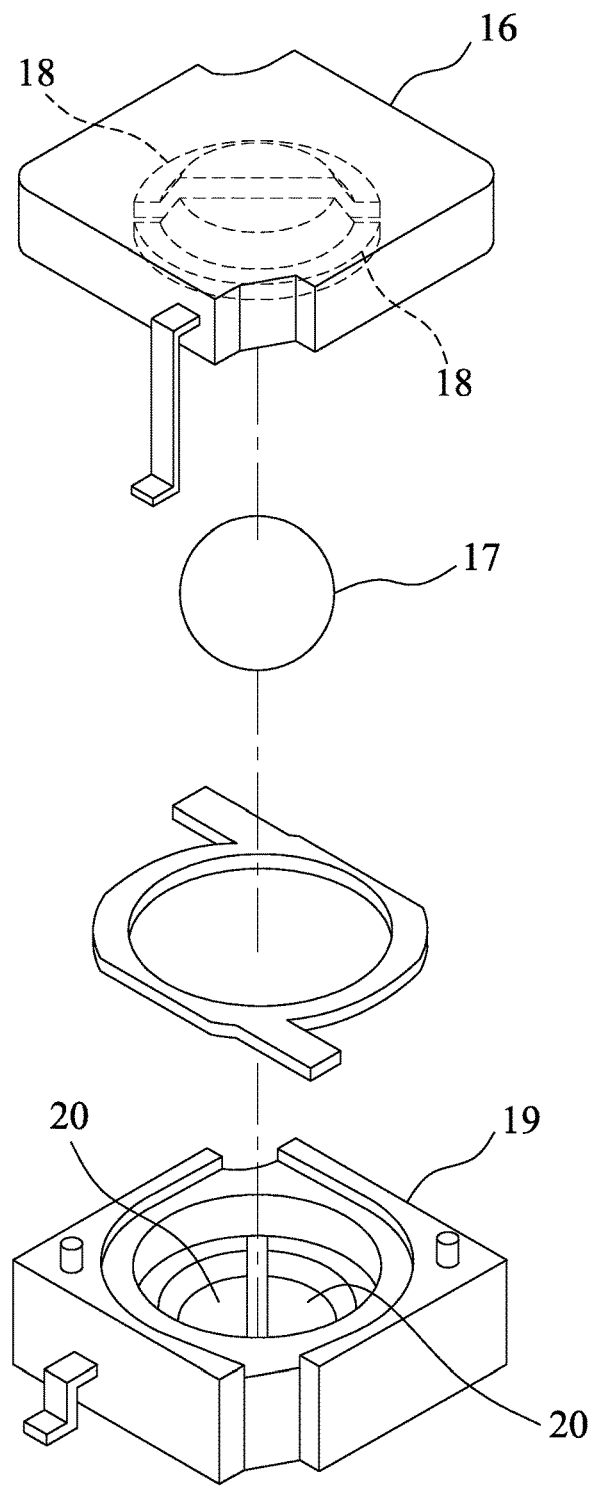
FIG. 3 is an exploded perspective view of a tilt sensor disclosed in Japanese Patent Publication No. JP2009117137.
Figure 4:
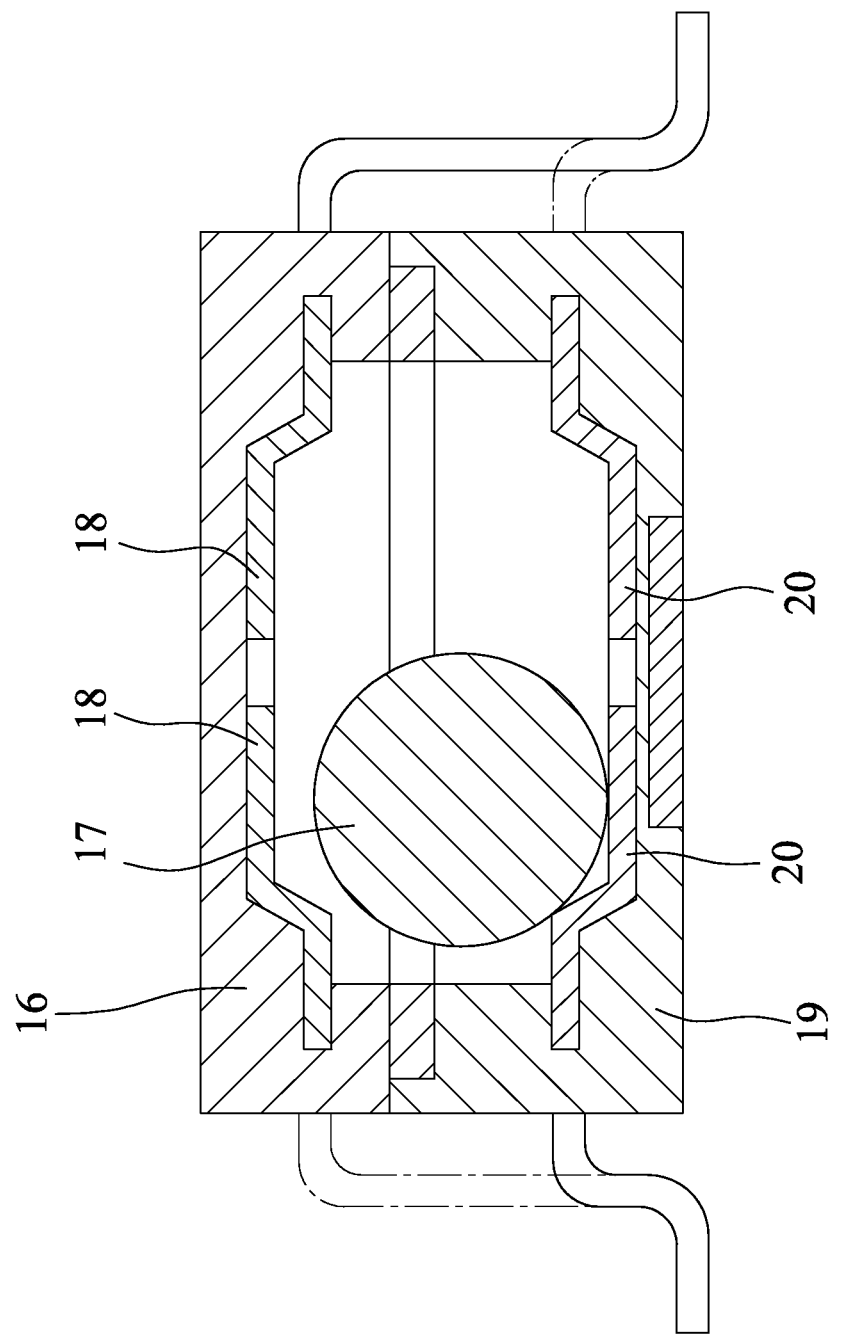
FIG. 4 is a sectional view of FIG. 3 in an assembled state.

Before the disclosure is described in greater detail with reference to the accompanying embodiments, it should be noted herein that like elements are denoted by the same reference numerals throughout the disclosure.

Figure 5:
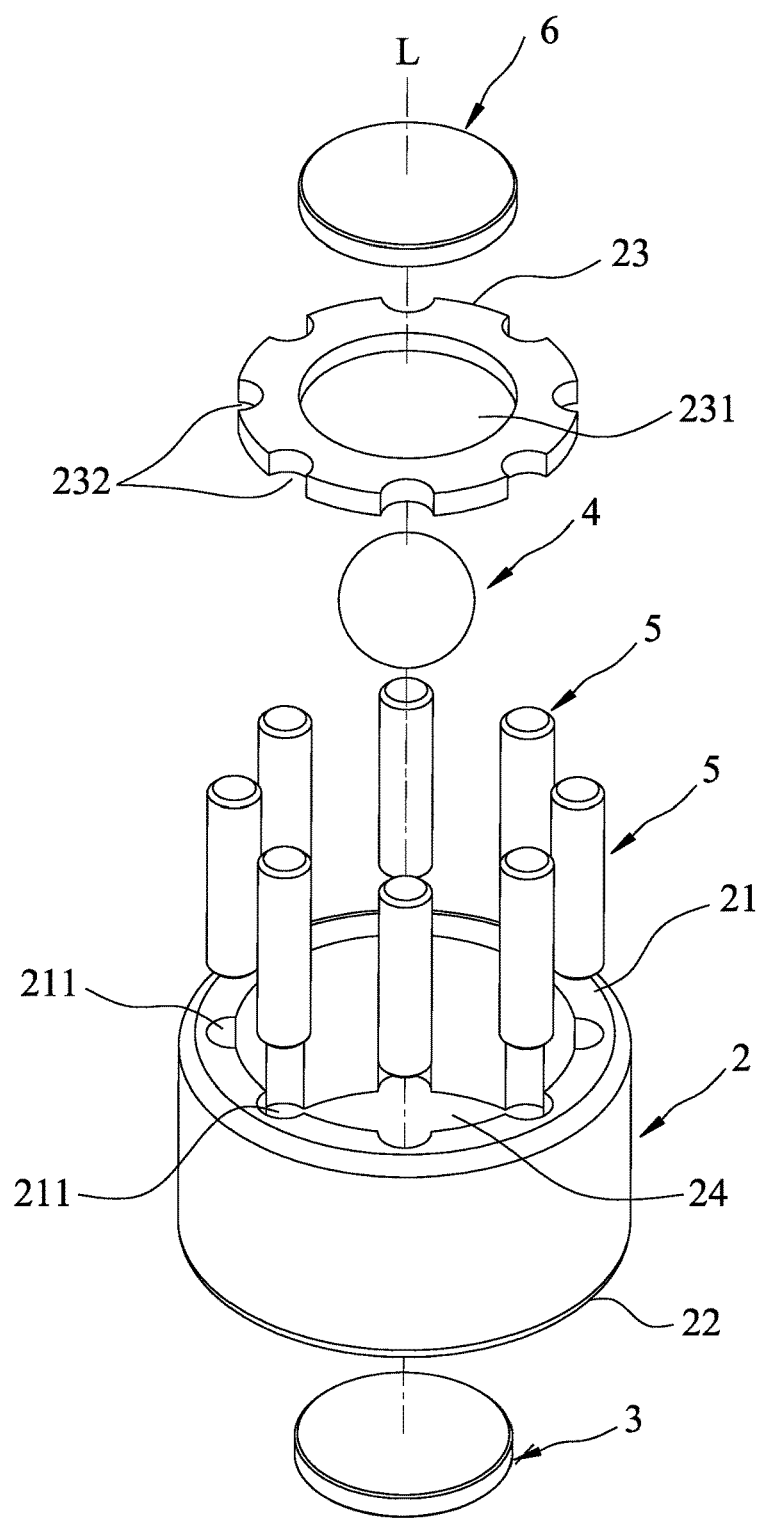
FIG. 5 is an exploded perspective view of the first embodiment of a multi-directional sensor according to the disclosure.
Figure 6:
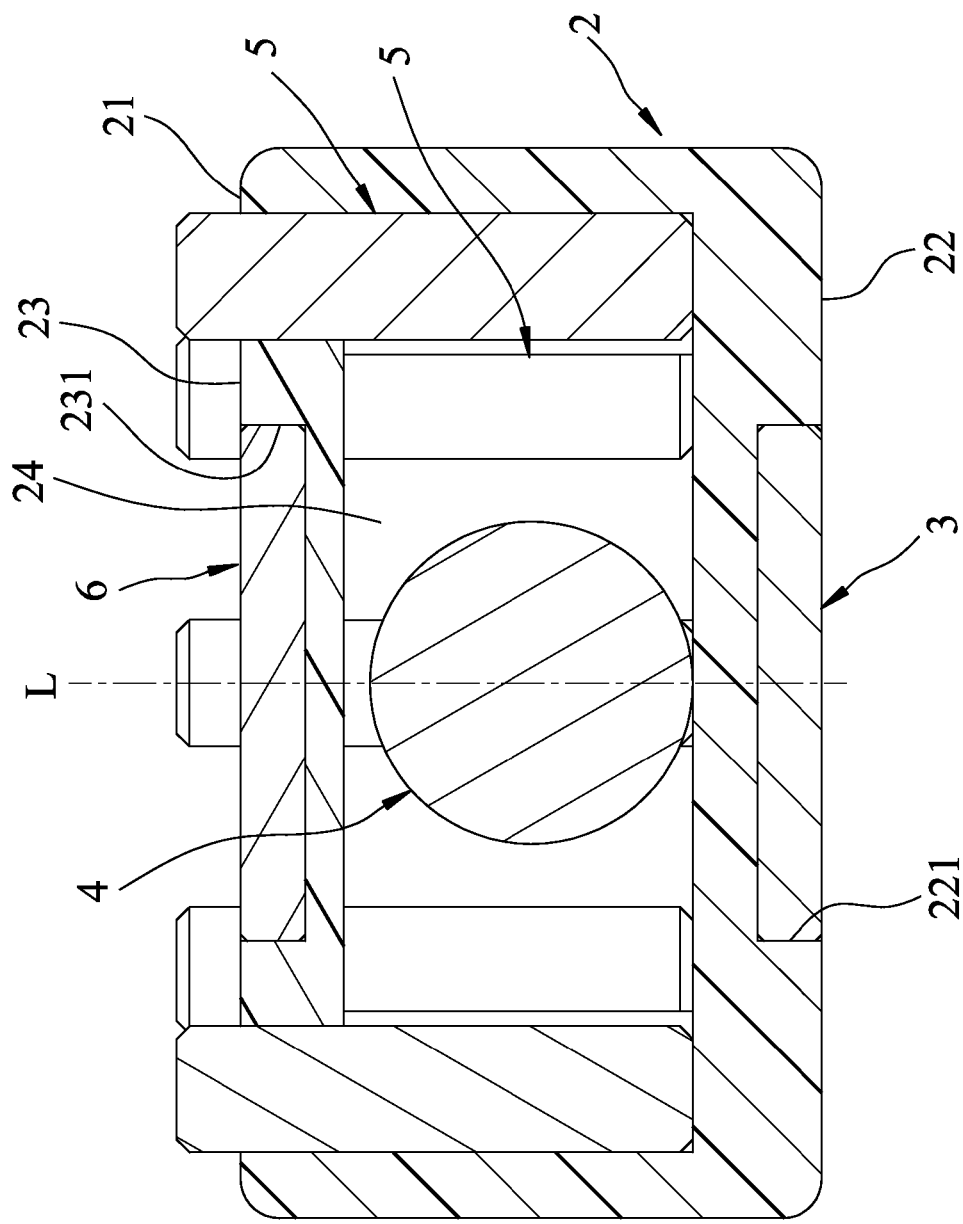
FIG. 6 is a sectional view of the first embodiment in an assembled state.
Figure 7:
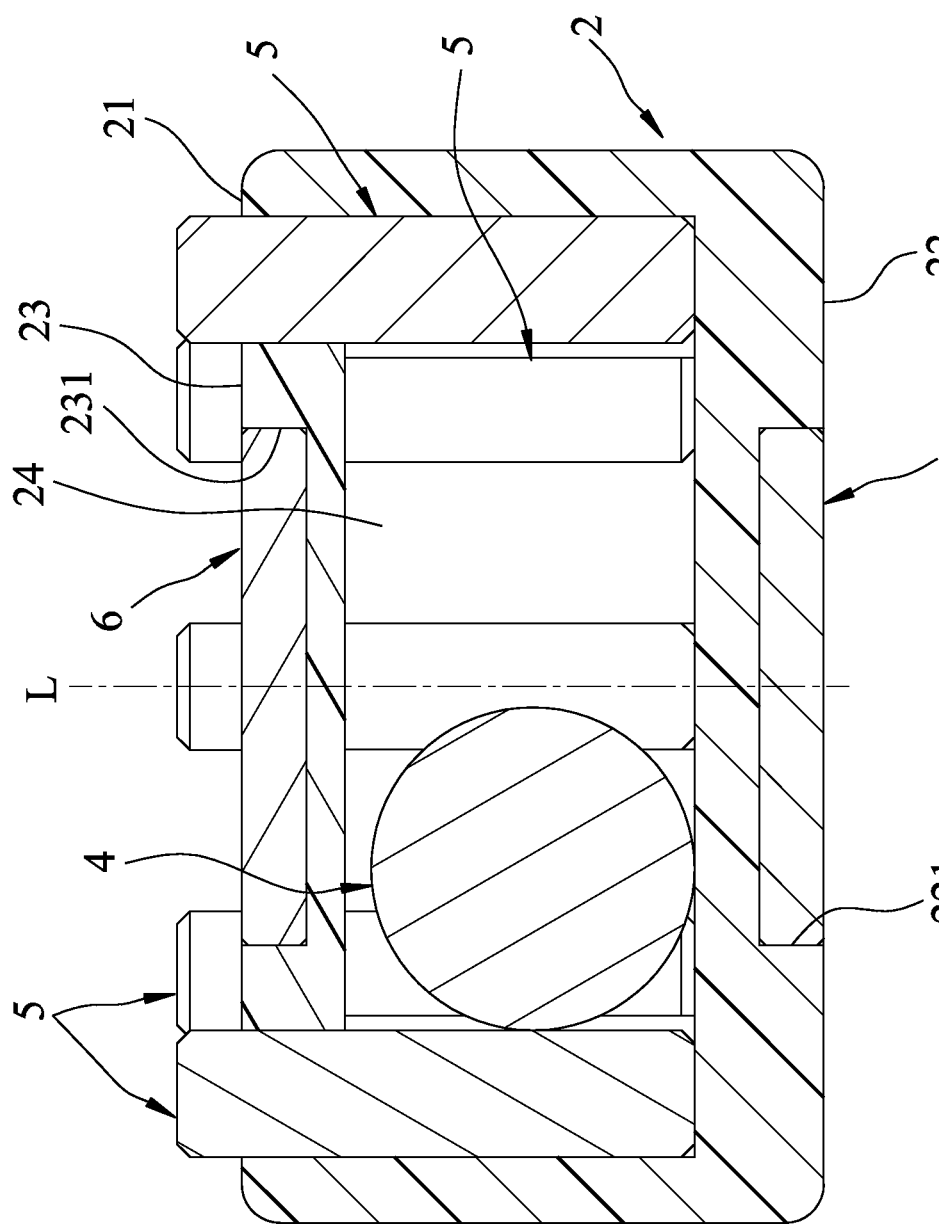
FIG. 7 is a view similar to FIG. 6, but illustrating how a conductive body bridges and interconnects two adjacent conductive terminals when the first embodiment is subjected to an impact.

Referring to FIGS. 5 to 7, a multi-directional sensor according to the first embodiment of the disclosure is shown to comprise a housing unit 2, a first magnetic component 3, a conductive body 4, a plurality of electrically conductive terminals 5 and a second magnetic component 6.

The housing unit 2 is made of an insulating material, and includes a surrounding wall 21 surrounding an axis (L), a bottom wall 22 connected to a bottom periphery of the surrounding wall 21, and a cover body 23 disposed on the surrounding wall 21 opposite to the bottom wall 22 along the axis (L). The surrounding wall 21, the bottom wall 22 and the cover body 23 cooperate to define a housing space 24.

In this embodiment, the surrounding wall 21 is cylindrical and the bottom wall 22 is circular. The surrounding wall 21 has a plurality of angularly spaced-apart axially extending slots 211 formed in an inner peripheral surface thereof and corresponding in number to the conductive terminals 5. Each of the slots 211 has a semicircular cross section, and opens toward the housing space 24. The bottom wall 22 has a positioning groove 221 formed in an outer surface thereof and having an opening that faces outward and away from the housing space 24. The first magnetic component 3 is disposed in the positioning groove 221 via the opening thereof.

The cover body 23 has a positioning groove 231 formed in a top surface thereof and having an opening that faces outward and away from the housing space 24. The second magnetic component 6 is disposed in the positioning groove 231 via the opening thereof. In this embodiment, the cover body 23 is circular to match the shape of the surrounding wall 21 and the bottom wall 22, and has a plurality of angularly spaced-apart semicircular notches 232 formed in an outer periphery thereof.

It is worth to mention herein that, although the positioning grooves 221, 231 of the bottom wall 22 and the cover body 23 respectively have an opening that faces outward in this embodiment, in an alternative embodiment, the openings of the positioning grooves 221, 231 may face inward, or the positioning grooves 221, 231 may be configured as through holes. Hence, the structure of the positioning grooves 221, 231 is not limited to what is disclosed herein. Further, if the positioning grooves 221, 231 are configured as through holes, the attractive force of the first and second magnetic components 3, 6 on the conductive body 4 can be increased.

The conductive body 4 is made of an electrically magnetically conductive material, is disposed in the housing space 24, and is magnetically attracted to the first and second magnetic components 3, 6. In this embodiment, the conductive body 4 is spherical, so that the conductive body 4 is rollable in the housing space 24 when an impact occurs and friction can be reduced. Hence, the sensitivity of the disclosure can be increased. However, the shape of the conductive body 4 is not limited to what is disclosed herein. During assembly, the first magnetic component 3, the conductive body 4 and the second magnetic component 6 are mounted in sequence along the axis (L).

In a normal or non-impact state, the conductive body 4 is magnetically attracted to one of the first and second magnetic components 3, 6 having the stronger magnetic force. In this embodiment, as shown in FIG. 6, the conductive body 4 is magnetically attracted to the first magnetic component 3 and abuts against the bottom wall 22.

Figure 8:
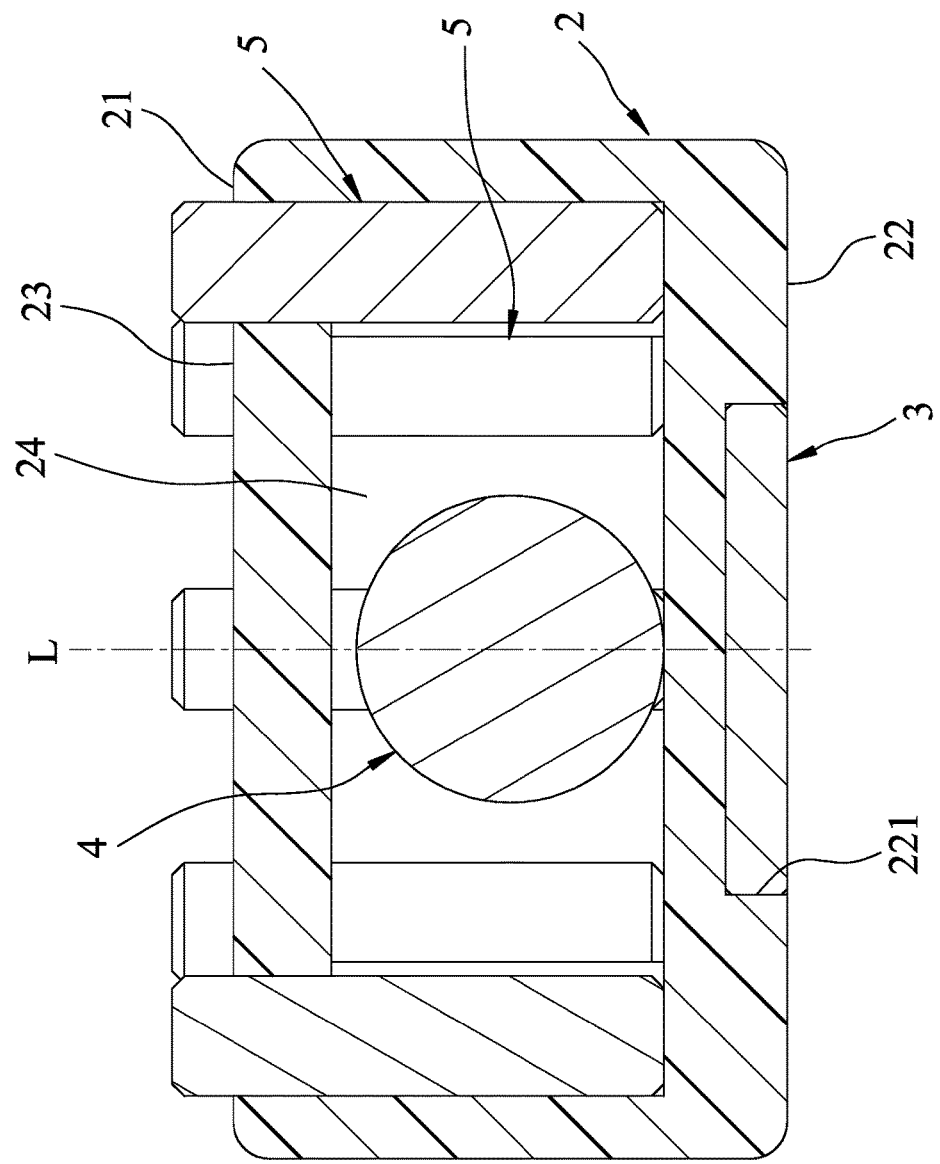
FIG. 8 is a sectional view of another modified form of the first embodiment.
Figure 9:
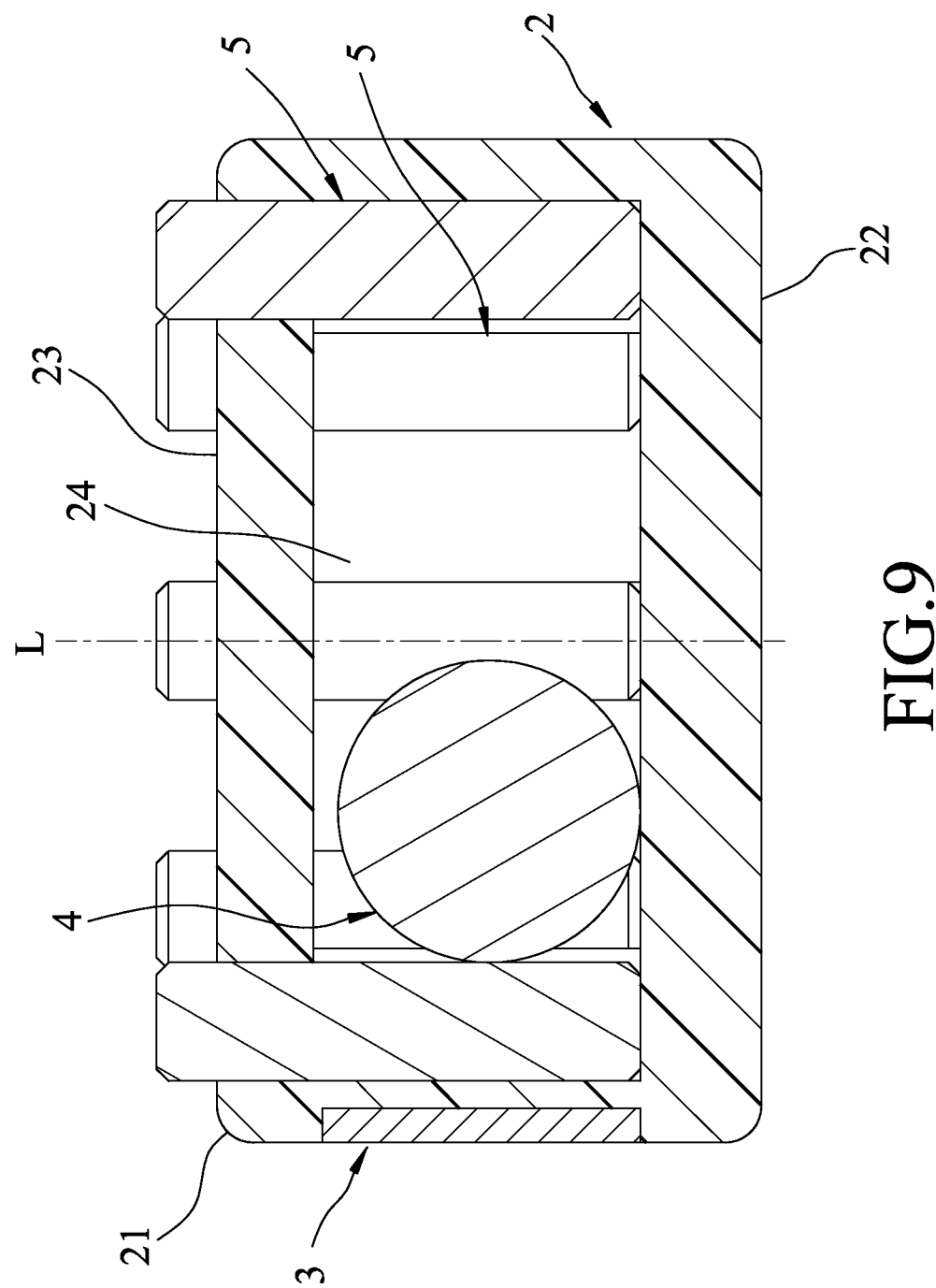
FIG. 9 is a sectional view of a third modified form of the first embodiment.

It is worth to mention herein that the multi-directional sensor of the first embodiment may only include the first magnetic component 3 (or the second magnetic component 6), as shown in FIG. 8, and the first magnetic component 3 (or the second magnetic component 6) may be disposed on an outer periphery of the surrounding wall 21, as shown in FIG. 9.

With reference to FIGS. 5 and 6, the electrically conductive terminals 5 are respectively inserted into the semicircular slots 211 of the housing 2, are arranged in an array, surround the axis (L) and the conductive body 4, and face the housing space 24. The semicircular notches 232 in the cover body 23 respectively cooperate with the semicircular slots 211 in the surrounding wall 21 to position the conductive terminals 5 in the housing unit 2. The conductive terminals 5 are configured to extend through the cover body 23 and out of the housing unit 2 so that exposed portions of the conductive terminals 5 can serve as connecting points for electrical connection with an external circuit board (not shown). Hence, by facing the exposed portions of the conductive terminals 5 toward the external circuit board, the assembly of the components of the disclosure can be performed with ease.

Moreover, the distance between each two adjacent ones of the conductive terminals 5 is smaller than the diameter of the conductive body 4. Through this, each time an impact occurs, the conductive body 4 can only contact two adjacent ones of the conductive terminals 5 so as to bridge and electrically interconnect the two adjacent conductive terminals, so that an impact signal can be generated. Thus, not only is the occurrence of impact can be detected, but also the direction of impact can be determined based on the position of the two electrically interconnected conductive terminals. Subsequent use of the system can thus be facilitated.

In this embodiment, the number of the conductive terminals 5 is set to more than four to surround the axis (L) and the conductive body 4 and to provide detection of multiple directions of impact. Further, each conductive terminal 5 is configured as an elongated cylinder that extends along the axis (L), so that each part of each conductive terminal 5 can serve as an impact detection point, so that missing of contact of the conductive body 4 with the conductive terminals can be avoided, thereby increasing the contact sensitivity of the multi-directional sensor of this embodiment.

In the normal or non-impact state, as shown in FIG. 6, the conductive body 4 is not in contact with the conductive terminals 5, and is magnetically attracted to the first magnetic component 3 so that it abuts against the bottom wall 22. When the multi-directional sensor is subjected to an impact, the conductive body 4 is forced to move toward two adjacent ones of the conductive terminals 5 which are opposite to the direction of impact due to inertia so as to bridge and electrically interconnect the two adjacent conductive terminals 5, as shown in FIG. 7, so that a signal can be generated. By detecting whether the conductive terminals 5 are electrically interconnected and which two adjacent ones of the conductive terminals 5 are electrically interconnected, the multi-directional sensor is subjected to an impact and the direction of impact can both be determined.

FIGS. 8 and 9 respectively show second and third modified forms of the first embodiment, where there is only one magnetic component, that is, the first magnetic component 3, provided on the bottom wall 22 and the surrounding wall 21. Similarly, in the non-impact state, the conductive body 4 is magnetically attracted to the first magnetic component 3 so that it abuts against the bottom wall 22 (see FIG. 8) or a left side of the surrounding wall 21 (see FIG. 9). When the multi-directional sensor is subjected to an impact, the conductive body 4 is forced to move toward two adjacent ones of the conductive terminals 5 which are opposite to the direction of impact due to inertia so as to bridge and electrically interconnect the two adjacent conductive terminals 5 so that a signal can be generated. Hence, the multi-directional sensor is subjected to an impact and the direction of impact can both be determined.

Figure 10:
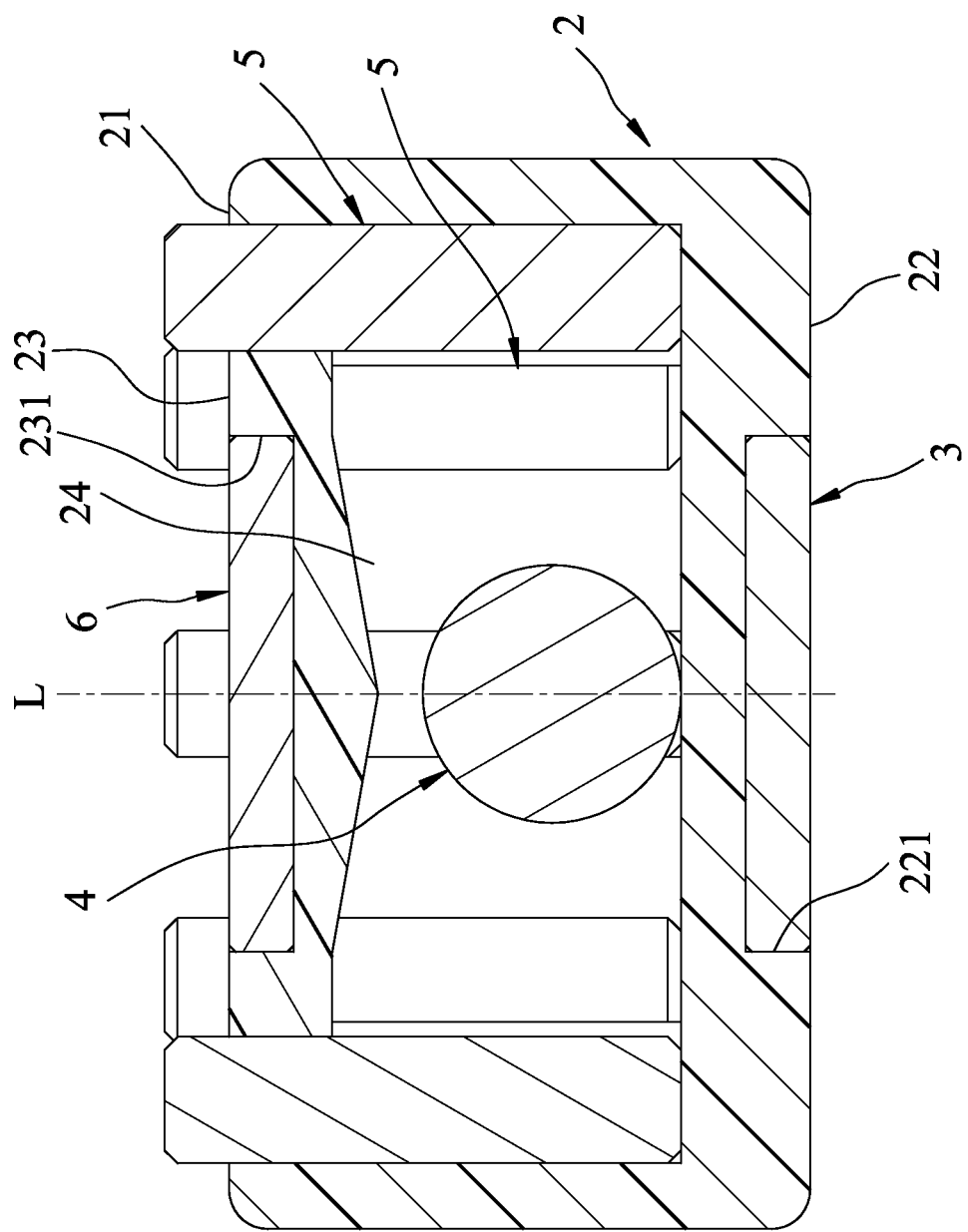
FIG. 10 is a sectional view of a fourth modified form of the first embodiment.
Figure 11:
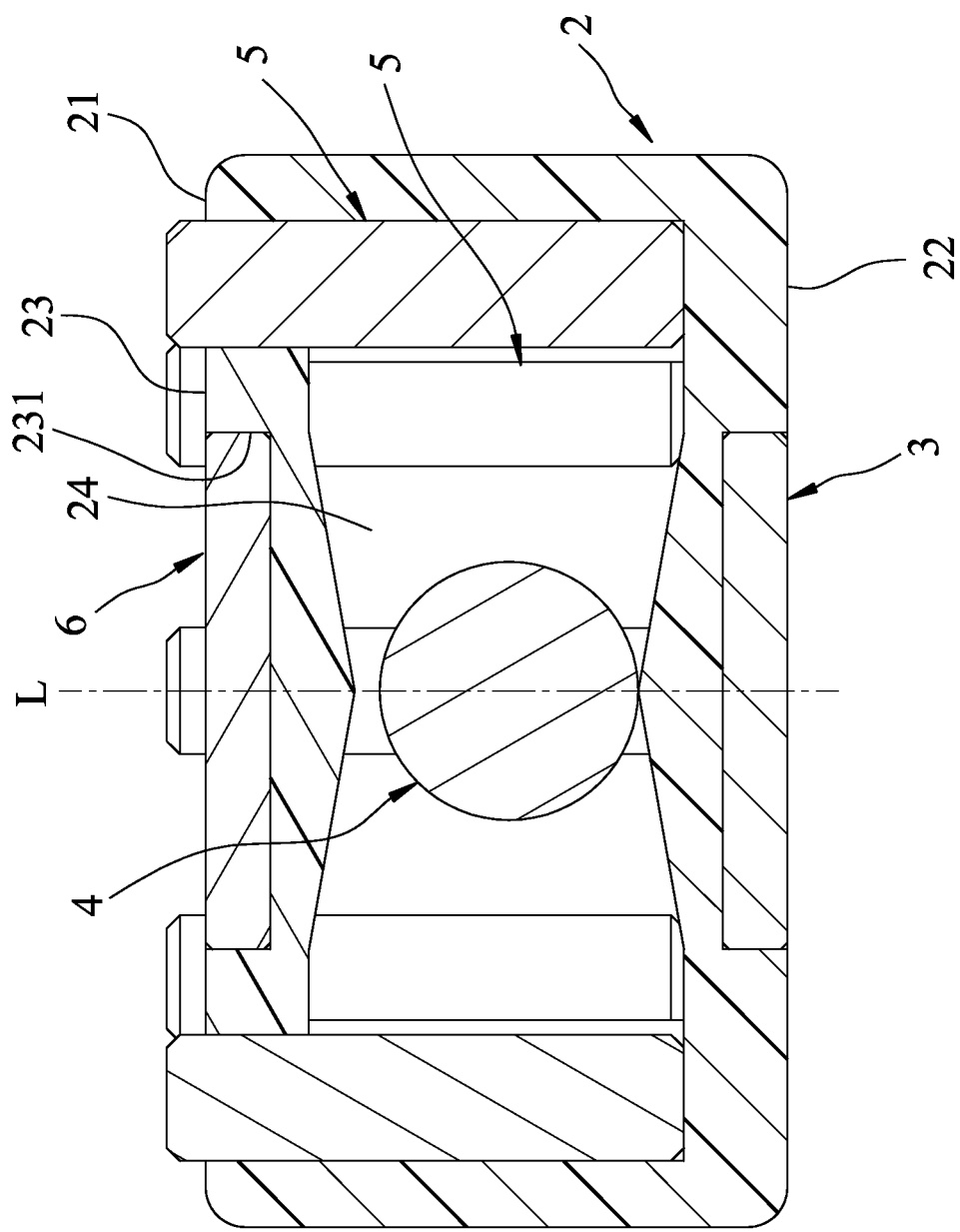
FIG. 11 is a sectional view of a fifth modified form of the first embodiment.

FIGS. 10 and 11 respectively illustrate the fourth and the fifth modified forms of the first embodiment. In FIG. 10, the cover body 23 has a protruding portion protruding toward the conductive body 4 along the axis (L). In FIG. 11, each of the bottom wall 22 and the cover body 23 has a protruding portion protruding toward the conductive body 4 along the axis (L), so that resistance during movement of the conductive body 4 can be reduced. Hence, the sensitivity of movement of the conductive body 4 can be more enhanced.

Figure 12:
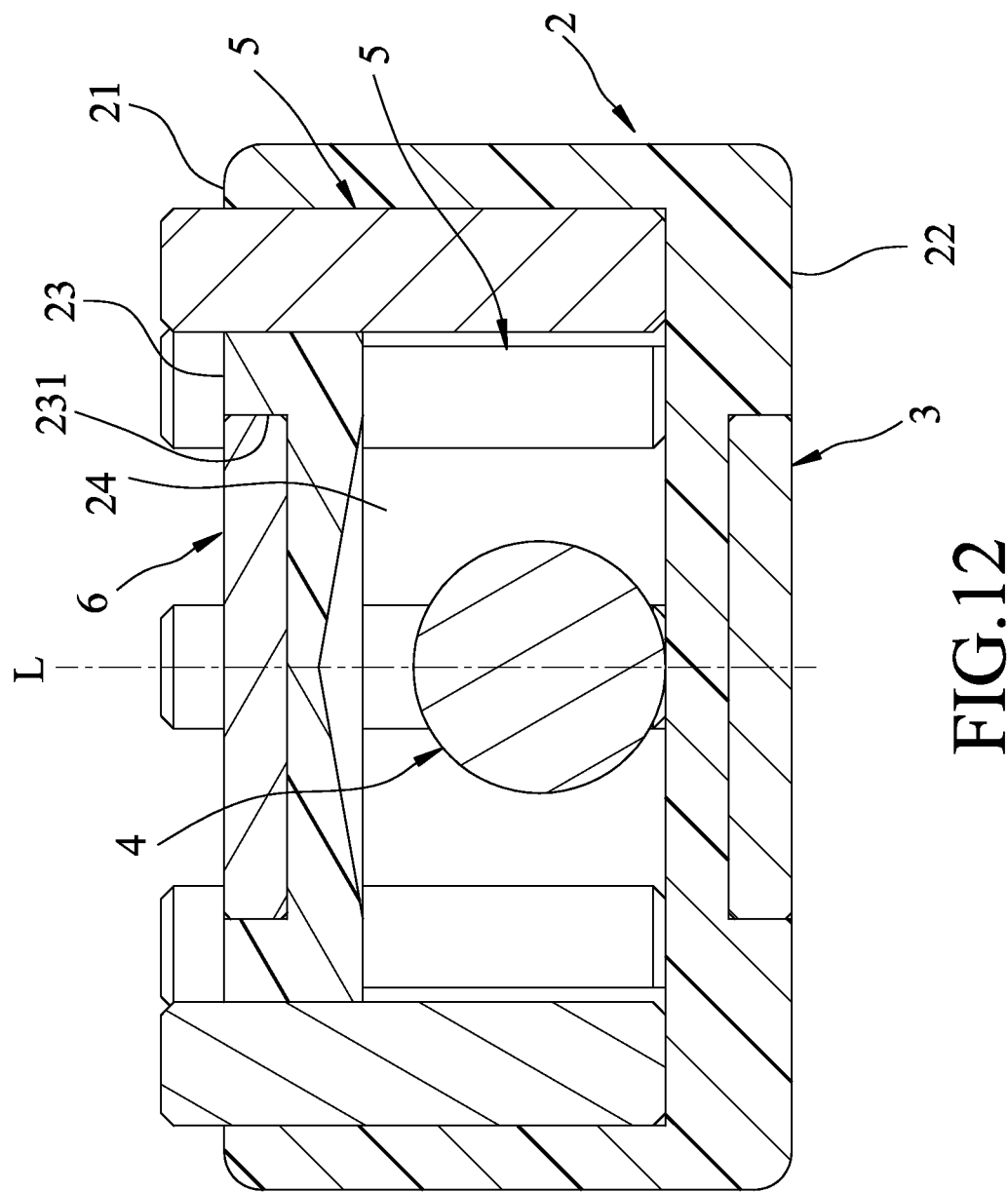
FIG. 12 is a sectional view of a sixth modified form of the first embodiment.
Figure 13:
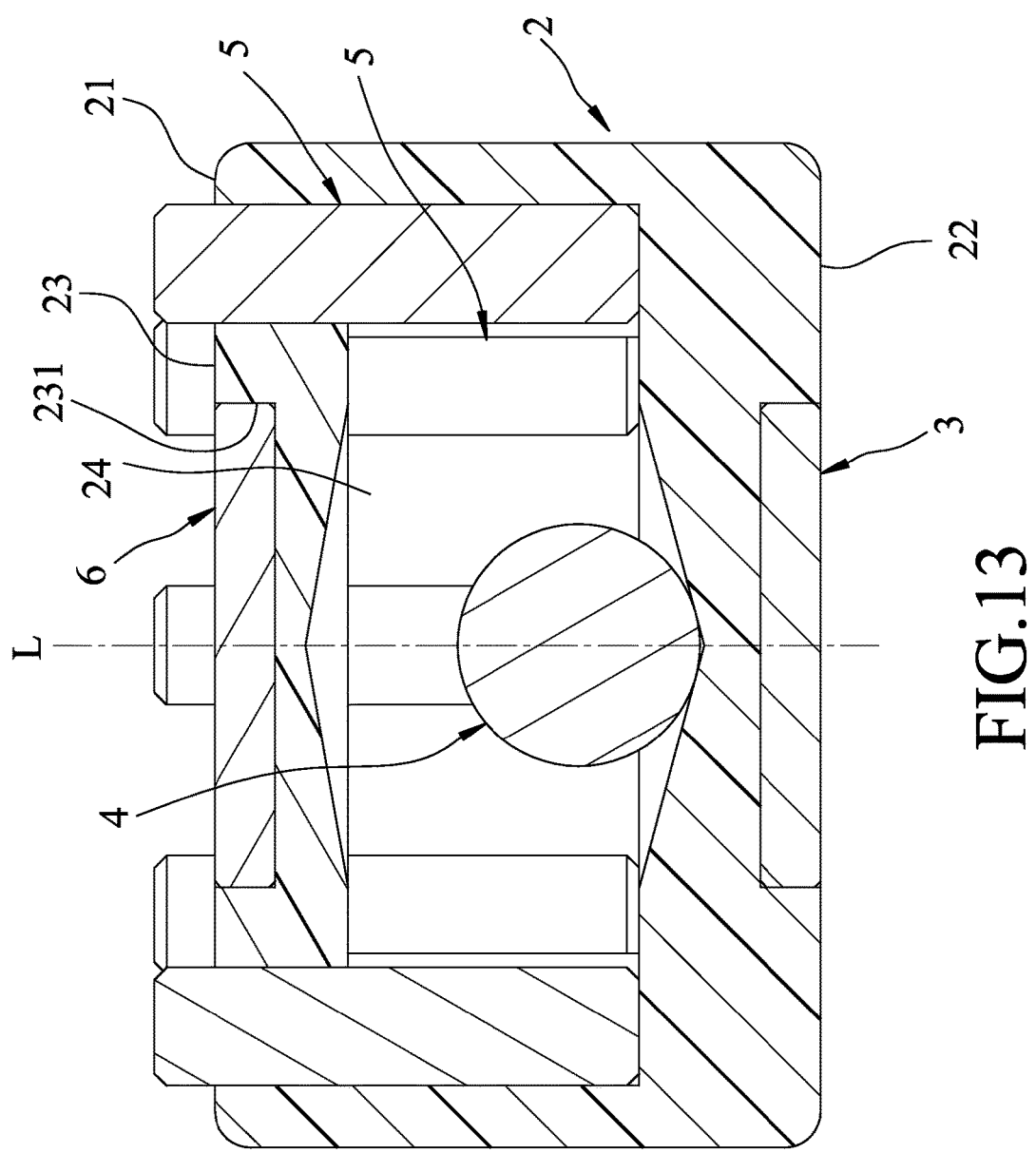
FIG. 13 is a sectional view of a seventh modified form of the first embodiment.

FIGS. 12 and 13 respectively show the sixth and the seventh modified forms of the first embodiment. In FIG. 12, the cover body 23 has an indented portion extending away from the conductive body 4 along the axis (L). In FIG. 13, each of the bottom wall 22 and the cover body 23 has an indented portion extending away from the conductive body 4 along the axis (L), so that the contact area during movement of the conductive body 4 can be increased to thereby increase the resistance. Hence, the sensitivity of movement of the conductive body 4 can be reduced in response to different application requirements.

From the foregoing description, the advantages of the first embodiment of the multi-directional sensor can be summarized as follows:

1) By surrounding the conductive body 4 with the conductive terminals 5, whether the conductive terminals 5 are electrically interconnected and which of the conductive terminals 5 are electrically interconnected can be detected, so that whether the multi-directional sensor is subjected to an impact and the direction of impact can both be determined. Subsequent use of the system can thus be facilitated.

2) Because the first and second magnetic components 3, 6 are close to each other, two opposite sides of the conductive body 4 are simultaneously magnetically attracted to the first and second magnetic components 3, 6, so that the stability of the multi-directional sensor of this disclosure is increased. In comparison with the conventional sensor which requires two bearings that lead to its complicate structure, the first embodiment has a relatively simple structure, so that the industrial applicability of the first embodiment can be increased.

3) By setting the number of the conductive terminals 5 to more than four and by arranging the conductive terminals 5 to surround the axis (L) and the conductive body 4, detection of multiple directions of impact can be provided. Moreover, with each conductive terminal being configured as an elongated cylinder that extends along the axis (L), each part of each conductive terminal 5 can serve as an impact detection point, so that missing of contact of the conductive body 4 with the conductive terminals 5 can be avoided, thereby increasing the contact sensitivity of the multi-directional sensor of this embodiment.

4) With the conductive body 4 and the conductive terminals 5 being disposed in the housing space 24 confined by the surrounding wall 21, the bottom wall 22 and the cover body 23, and by using the insulating material for making the housing unit 2, the issue of electric shock in the prior arts can be avoided. Hence, the multi-directional sensor of this embodiment is safe to use.

5) With the at least one of the bottom wall 22 and the cover body 23 being configured to have a protruding portion or an indented portion along the axis (L), the sensitivity of movement of the conductive body 4 can be increased or reduced in response to the different application requirements. The application of this embodiment can thus be widened.

Figure 14:
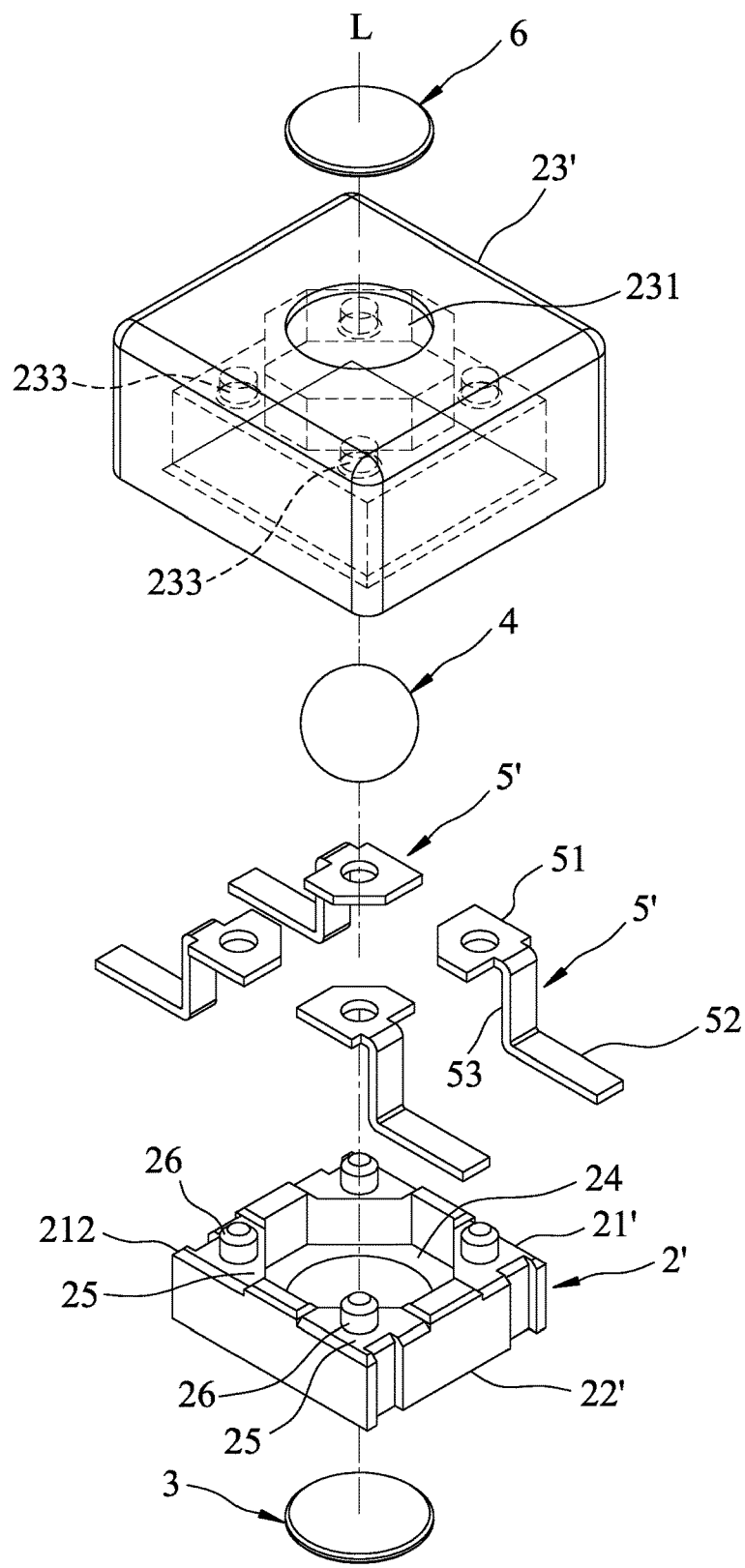
FIG. 14 is an exploded perspective view of the second embodiment of a multi-directional sensor according to the disclosure.
Figure 15:
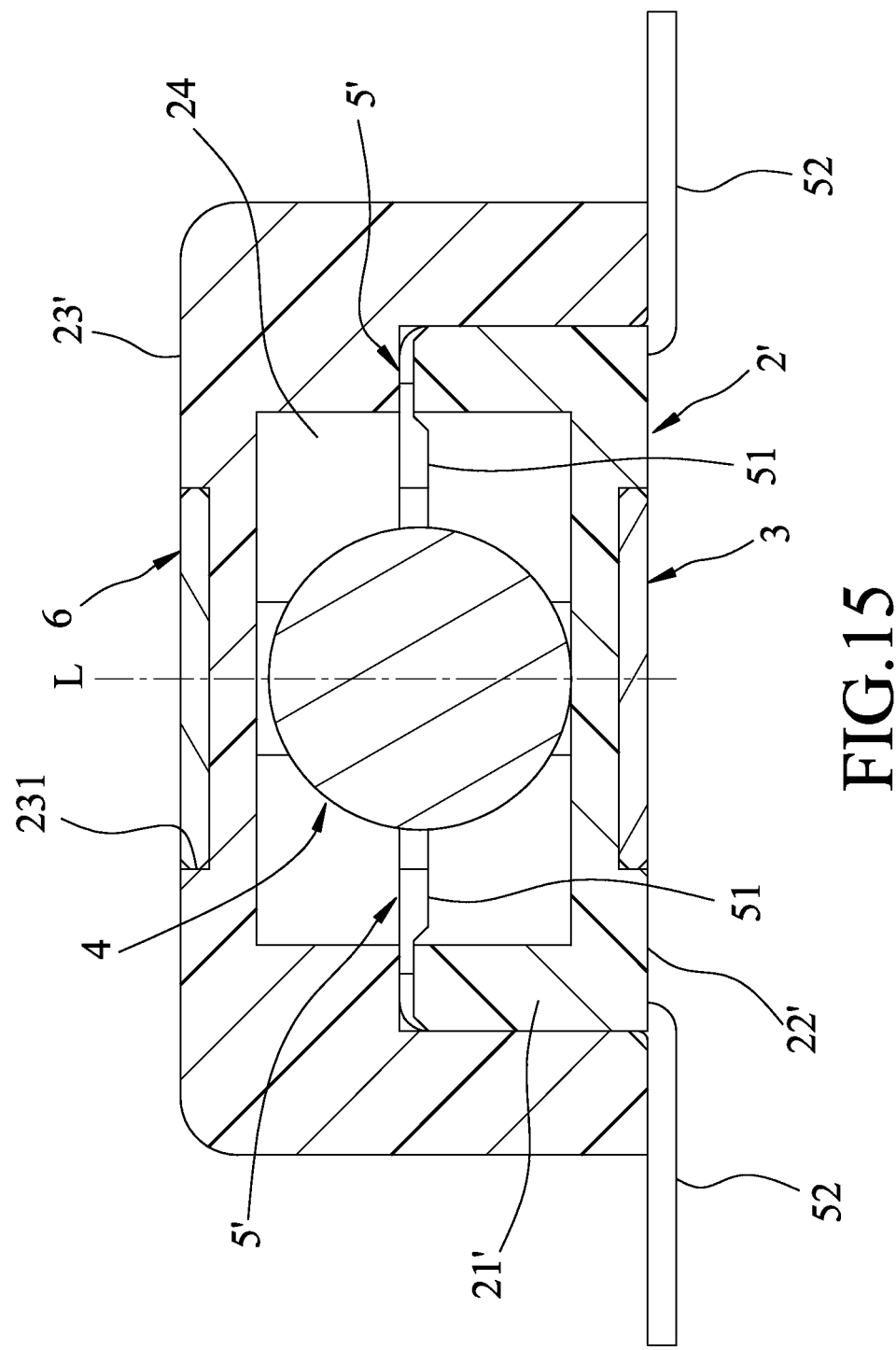
FIG. 15 is a sectional view of the second embodiment in an assembled state.
Figure 16:
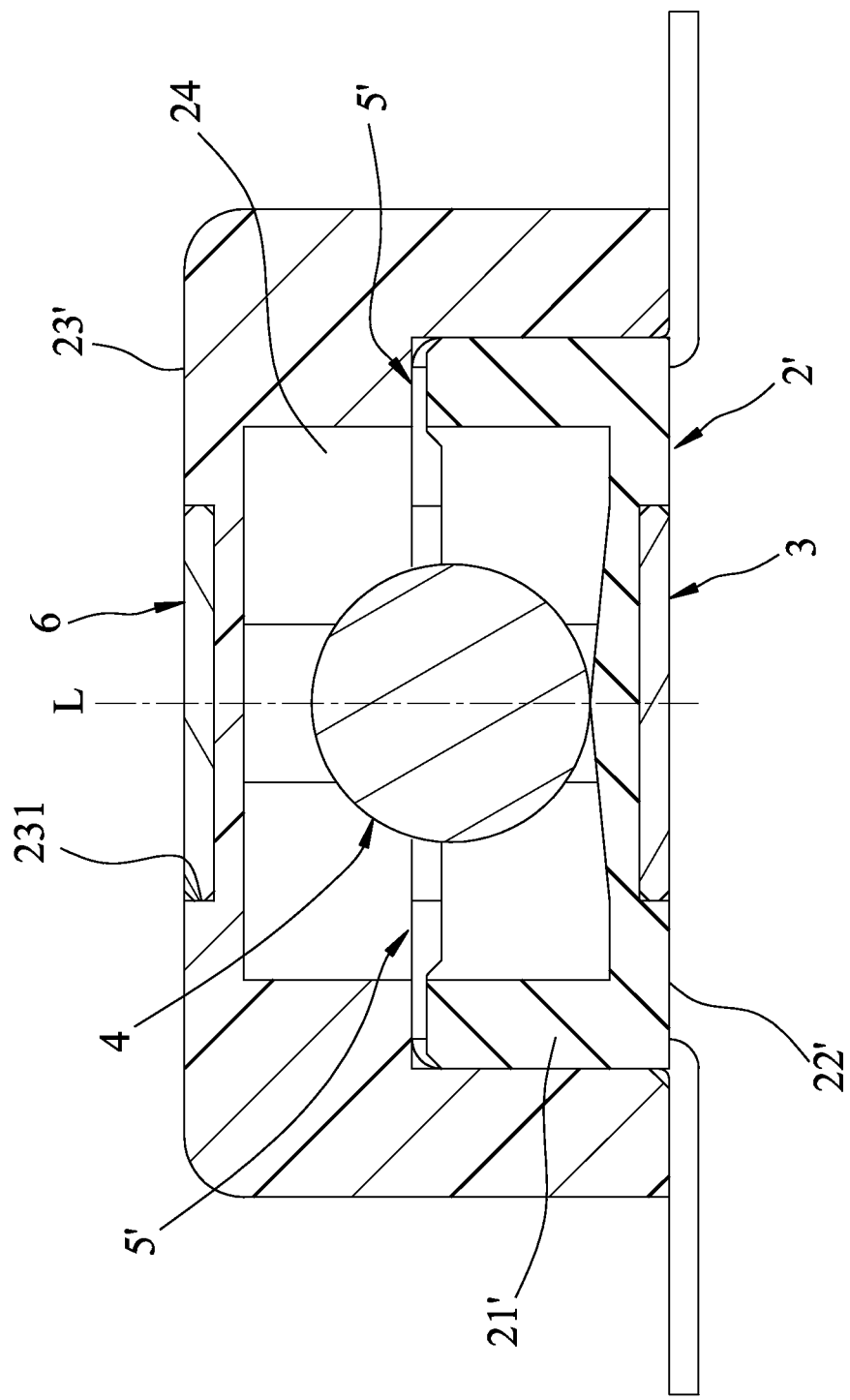
FIG. 16 is a sectional view of another modified form of the second embodiment.
Figure 17:
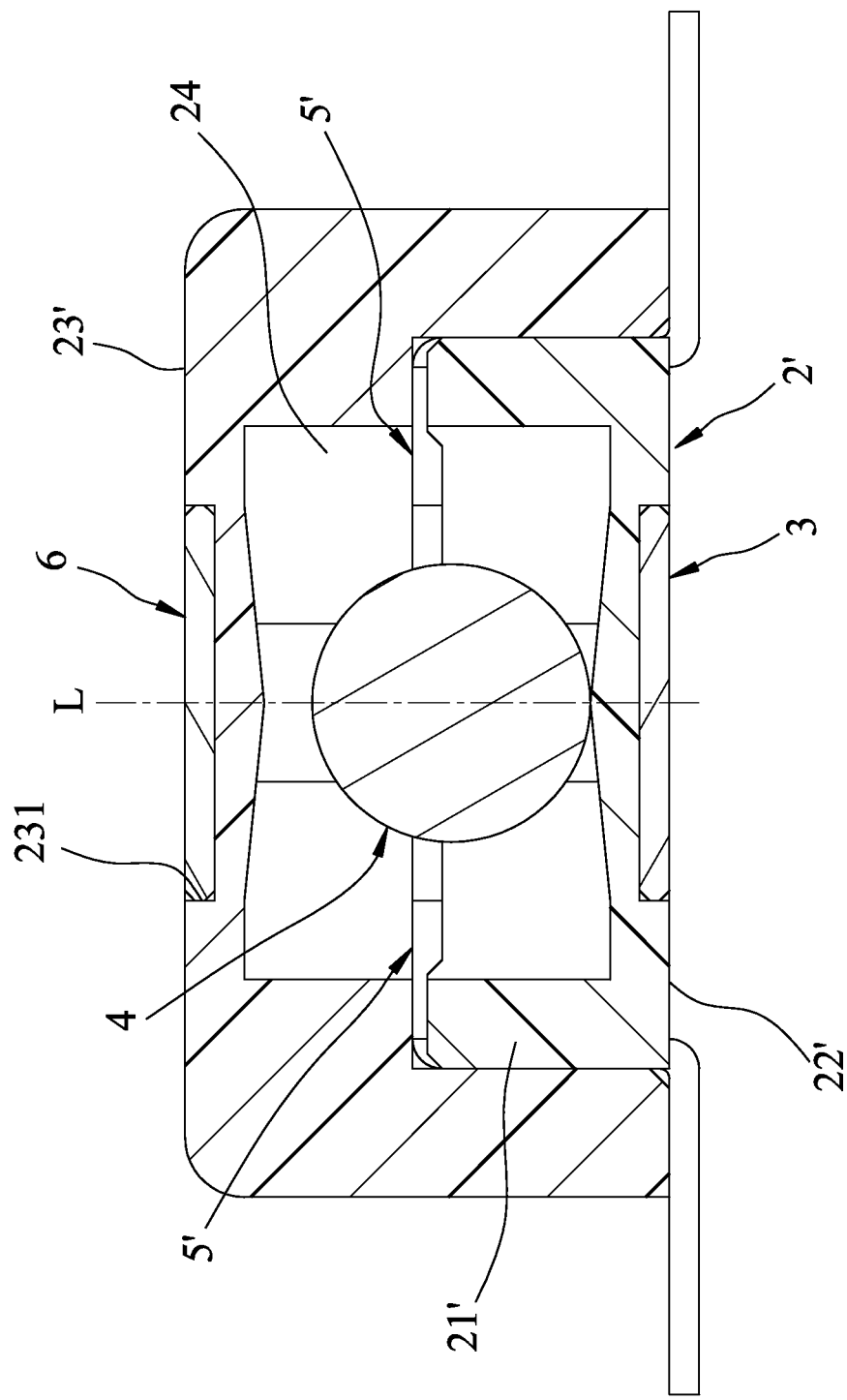
FIG. 17 is a sectional view of a third modified form of the second embodiment.
Figure 18:
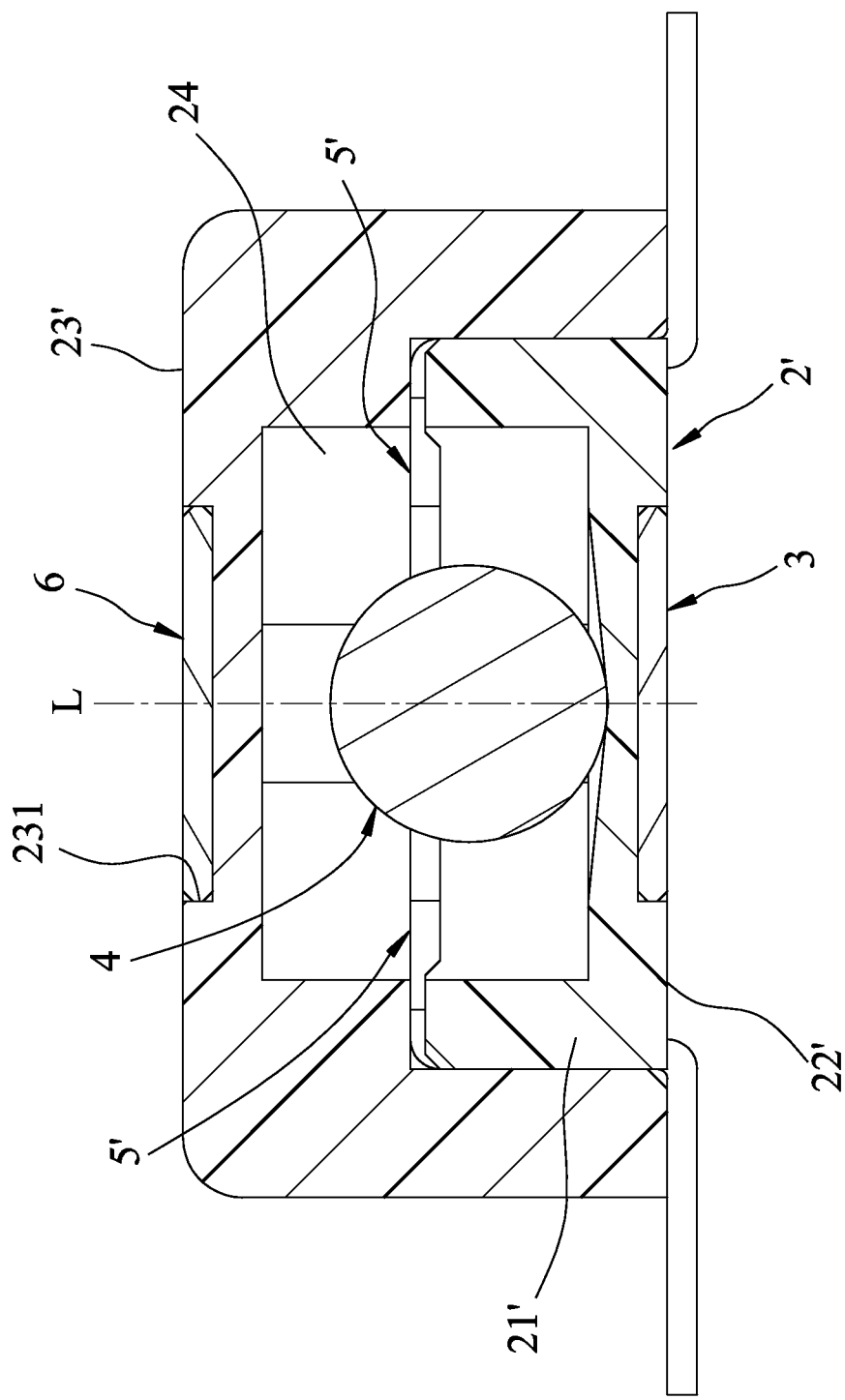
FIG. 18 is a sectional view of a fourth modified form of the second embodiment.
Figure 19:
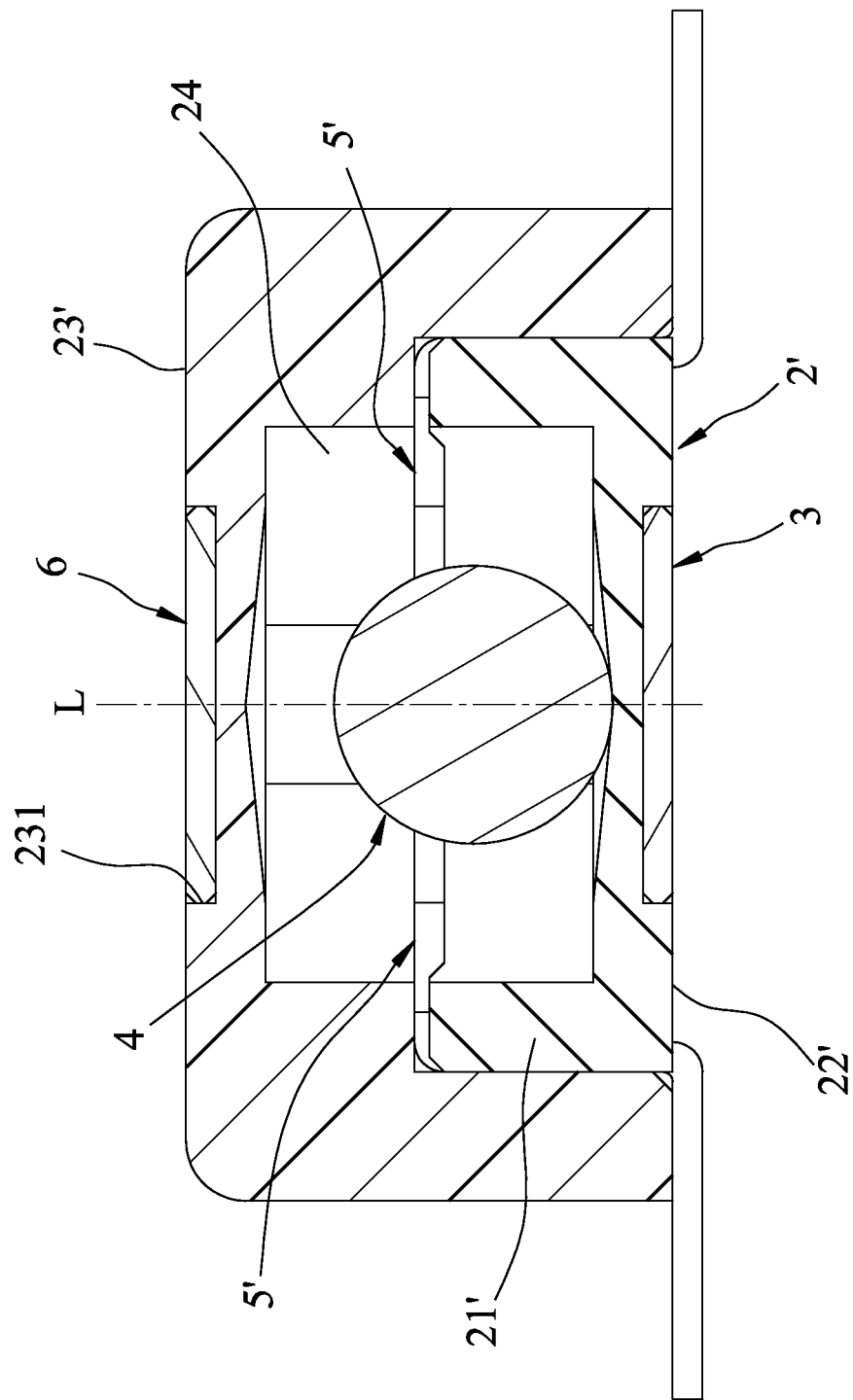
FIG. 19 is a sectional view of a fifth modified form of the second embodiment.

Referring to FIGS. 14 and 15, the second embodiment of the multi-directional sensor according to this disclosure is shown to be generally identical to the first embodiment. Particularly, the multi-directional sensor of this embodiment comprises a housing unit 2', first and second magnetic components 3 and 6, a conductive body 4, and a plurality of electrically conductive terminals 5'. However, in this embodiment, each of the surrounding wall 21', the bottom wall 22' and the cover body 23' has a square shape, and the housing unit 2' further includes four cutouts 25 formed in a top end surface 212 of the surrounding wall 21' and located at four corners of the surrounding wall 21', and four first engagement portions 26 respectively disposed in the cutouts 25. Each of the first engagement portions 26 is configured as a protrusion.

The housing unit 2' further includes four spaced-apart second engagement portions 233 provided on the cover body 23'. Each of the second engagement portions 233 is configured as a groove to engage a respective first engagement portion 26. Alternatively, each of the first engagement portions 26 may be configured as a groove, while each of the second engagement portions 233 may be configured as a protrusion. The structures of the first and second engagement portions 26, 233 are not limited to what is disclosed herein.

In this embodiment, four conductive terminals 5' are respectively disposed at the four corners of the surrounding wall 21'. Each of the conductive terminals 5' is configured as a flat bent plate that includes a first terminal portion 51 inserted into a respective one of the first engagement portions 26 via a through hole thereof and received in a corresponding one of the cutouts 25, a second terminal portion 52 opposite to the first terminal portion 51 and extending out of the housing unit 2', and an intermediate portion 53 between the first and second terminal portions 51, 52. A part of the first terminal portion 51 of each conductive terminal 5' extends into the housing space 24 for the conductive body 4 to contact. The second terminal portions 52 of the conductive terminals 5' can be directly electrically connected to an external circuit board. Thus, the ease of use of the second embodiment can be increased.

FIGS. 16 to 19 respectively show the second to fifth modified forms of the second embodiment. In these modified forms, at least one of the bottom wall 22' and the cover body 23' is provided with a protruding portion or an indented portion that protrudes toward or extends away from the conductive body 4 along the axis (L).

The advantages described in the first embodiment can be similarly achieved using the second embodiment. Further, with the configuration of the conductive terminals 5' being flat bent plates, the consumption of the metal material can be minimized, and the weight, the size and the cost of the second embodiment can be reduced.

Figure 20:
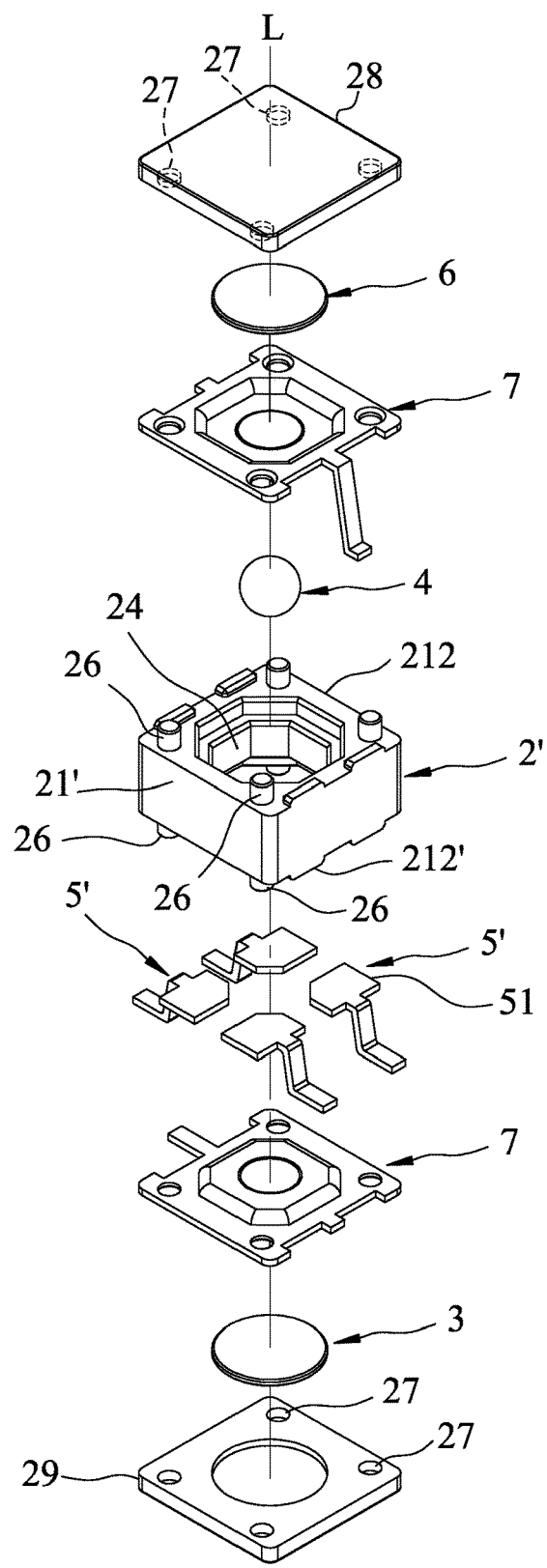
FIG. 20 is an exploded perspective view of the third embodiment of a multi-directional sensor according to the disclosure.
Figure 21:
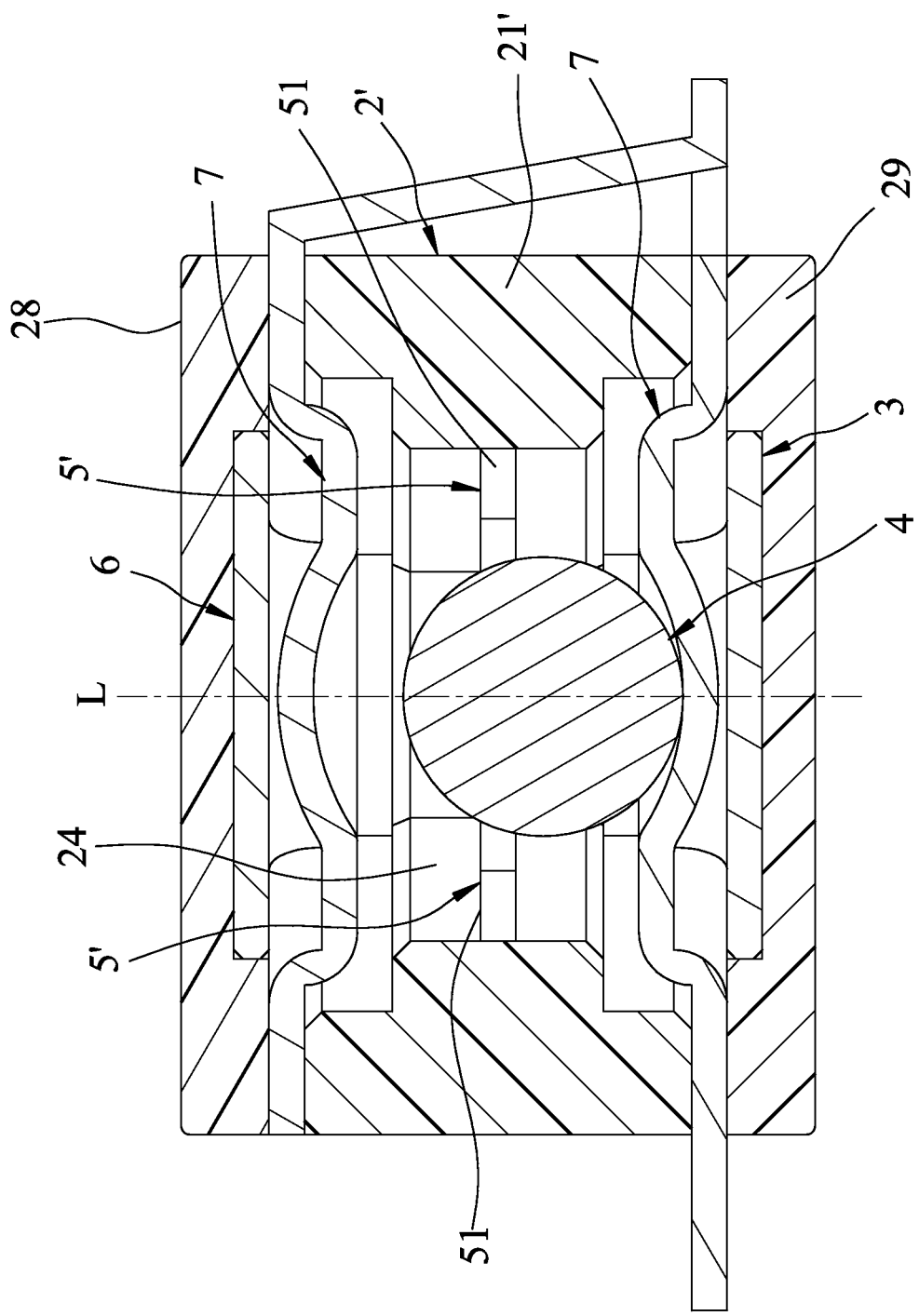
FIG. 21 is a sectional view of the third embodiment in an assembled state.

Referring to FIGS. 20 and 21, the third embodiment of the multi-directional sensor according to this disclosure is shown to be generally identical to the second embodiment. However, in this embodiment, the conductive plates 7 disposed on top and bottom end surfaces 212, 212' of the surrounding wall 21', opposite to each other along the axis (X), and facing the housing space 24. The first magnetic element 3, one of the conductive plates 7, the conductive body 4, the other conductive plate 7 and the second magnetic component 6 are mounted in sequence along the axis (L). The distance between the conductive plates 7 along the axis (L) is larger than the length of the conductive body 4 along the axis (L). Each of the conductive plates 7 has a guide pin exposed from the housing unit 2 to facilitate assembly.

It is worth to mention herein that, for convenience of illustration, in FIG. 20, the housing unit 2 and the conductive terminals 5' are drawn separately, but in actual production, the conductive terminals 5' are embedded in the housing unit 2' and are injection molded together with the housing unit 2'. A part of the first terminal portion 51 of each conductive terminal 5' extends into the housing space 24 for the conductive body 4 to contact. Thus, the connection of the conductive terminals 5' with the housing unit 2' is strong without additional engagement structure.

The housing unit 2' includes eight first engagement portions 26, eight second engagement portions 27, an upper cover body 28, and a lower cover body 29. Four of the first engagement portions 26 are disposed on four corners of the top end surface 212 of the surrounding wall 21', while the other four of the first engagement portions are disposed on four corners of the bottom end surface 212' of the surrounding wall 21'. Each of the first engagement portions 26 is configured as a protrusion.

The upper and lower cover bodies 28, 29 cooperate with the surrounding wall 21' to clamp the conductive plates 7 and the first and second magnetic components 3, 6 thereamong. Four of the second engagement portions 27 are disposed on the upper cover body 28, while the other four of the second engagement portions 27 are disposed on the lower cover body 29. Each of the second engagement portions 27 is configured as a groove to engage a respective first engagement portion 26. Alternatively, each first engagement portion 26 may be configured as a groove, while each second engagement portion 27 may be configured as a protrusion. The structures of the first and second engagement portions are not limited to what is disclosed herein.

In a normal or non-impact state, as shown in FIG. 21, the conductive body 4 is magnetically attracted to the first magnetic component 3 and abuts against one of the conductive plates 7 that is proximate to the first magnetic component 3. When the multi-directional sensor is subjected to an impact, the conductive body 4 is forced to move toward the first terminal portions 51 of two adjacent ones of the conductive terminals 5' or one of the conductive plates 7 and a corresponding one of the conductive terminals 5' which are opposite to the direction of impact due to inertia so as to bridge and electrically interconnect the two adjacent conductive terminals 5' or the conductive plate 7 and the corresponding conductive terminal 5', so that a signal can be generated. Hence, by detecting whether the conductive terminals 5 and the conductive plates 7 are electrically interconnected and which of the conductive terminals 5 and the conductive plates 7 are electrically interconnected, whether the multi-directional sensor is subjected to impact and the direction of impact can both be determined. In this way, detection of impact at all directions can be provided.

Figure 22:
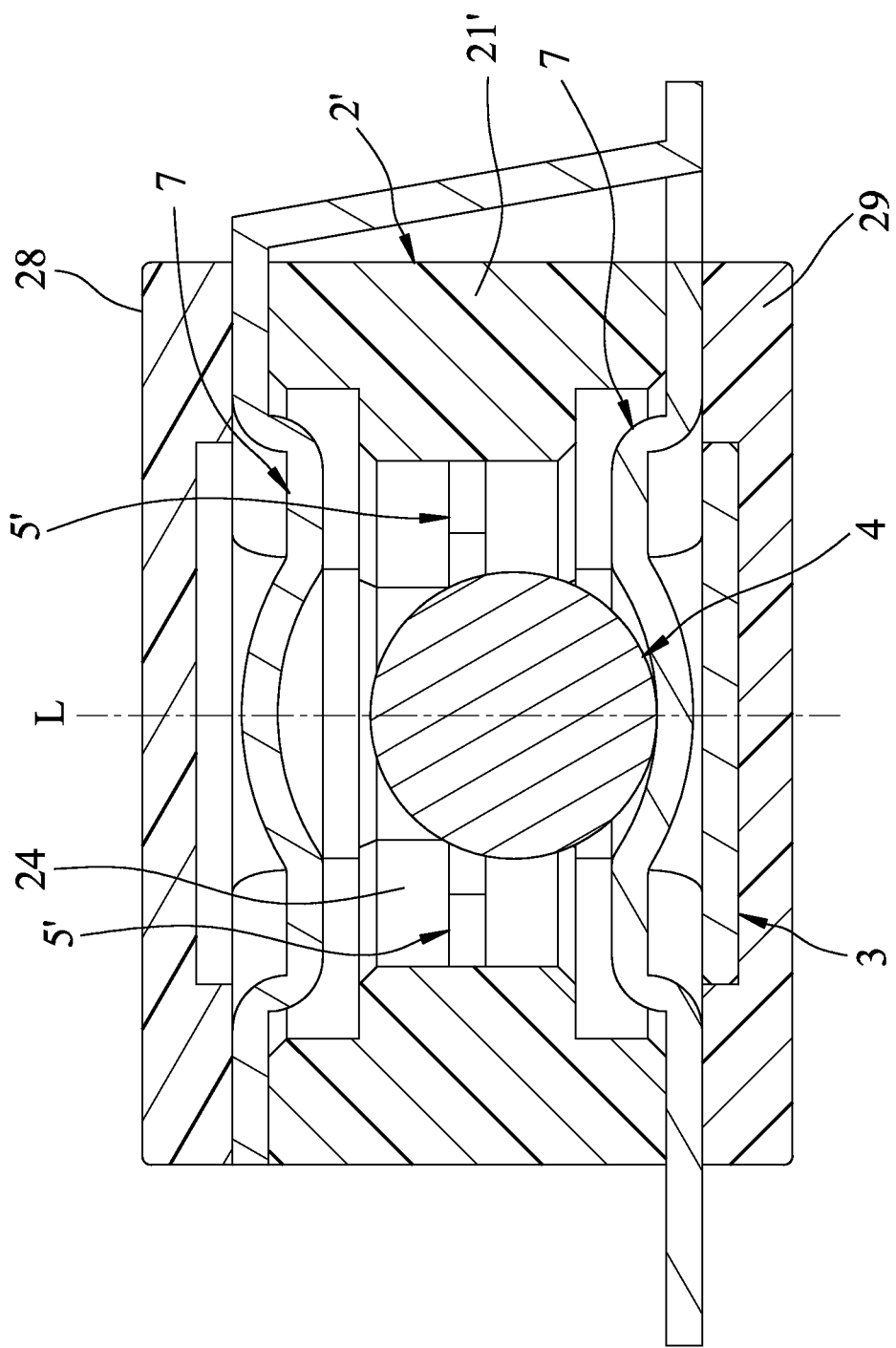
FIG. 22 is a sectional view of another modified form of the third embodiment.

It is worth to mention herein that, like the first embodiment, the third embodiment may also include only one magnetic component, that is, the first magnetic component 3 (or the second magnetic component 6), as shown in FIG. 22, and the first magnetic component 3 may be disposed on the surrounding wall 21'.

The advantages described in the first embodiment can be similarly achieved using the third embodiment. Moreover, with the conductive plates 7 being disposed spaced apart from each other along the axis (L), detection of impact at all directions can be provided, thereby greatly facilitating subsequent use of the system.

Figure 23:
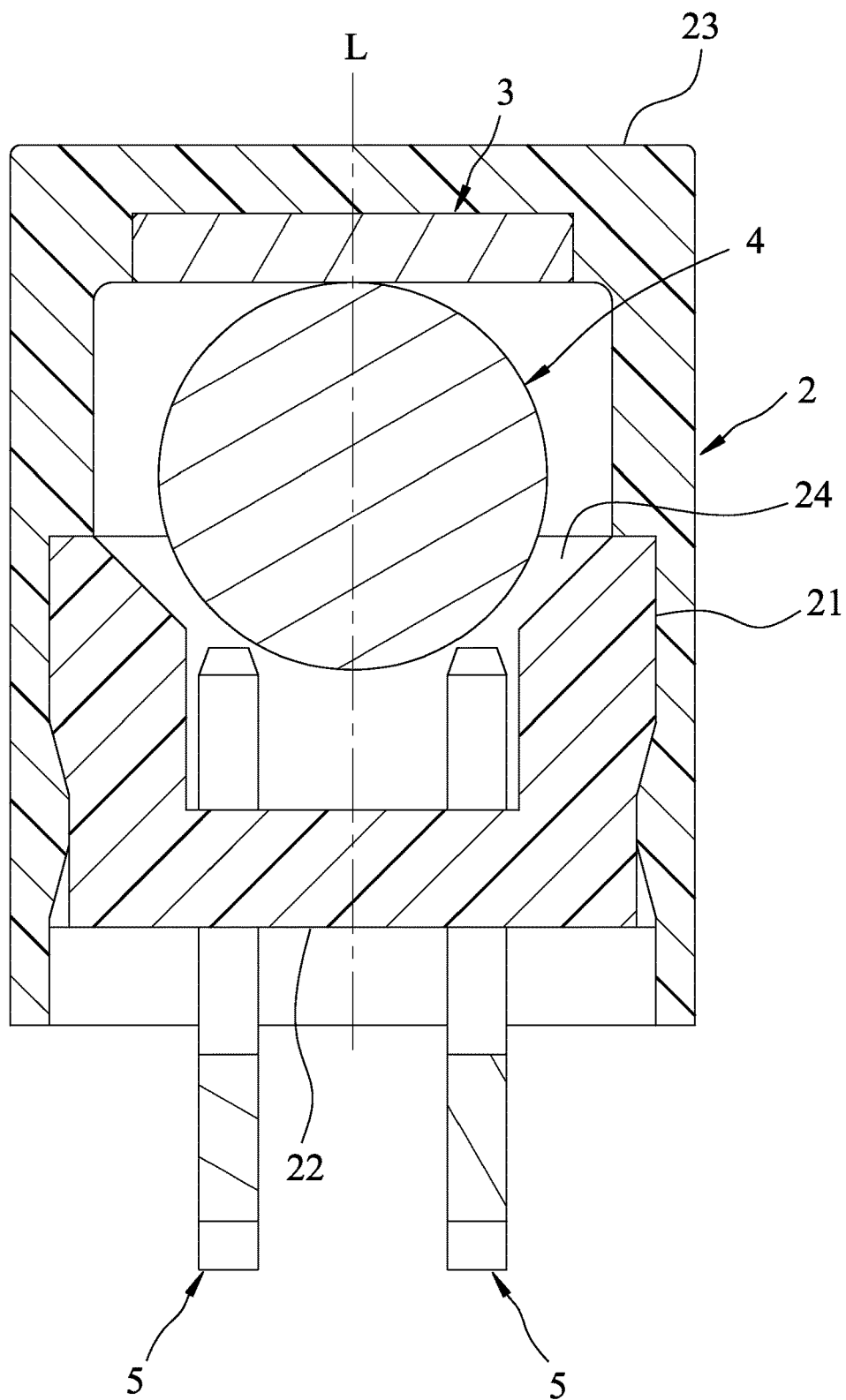
FIG. 23 is a sectional view of the fourth embodiment of a multi-directional sensor according to the disclosure.
Figure 24:
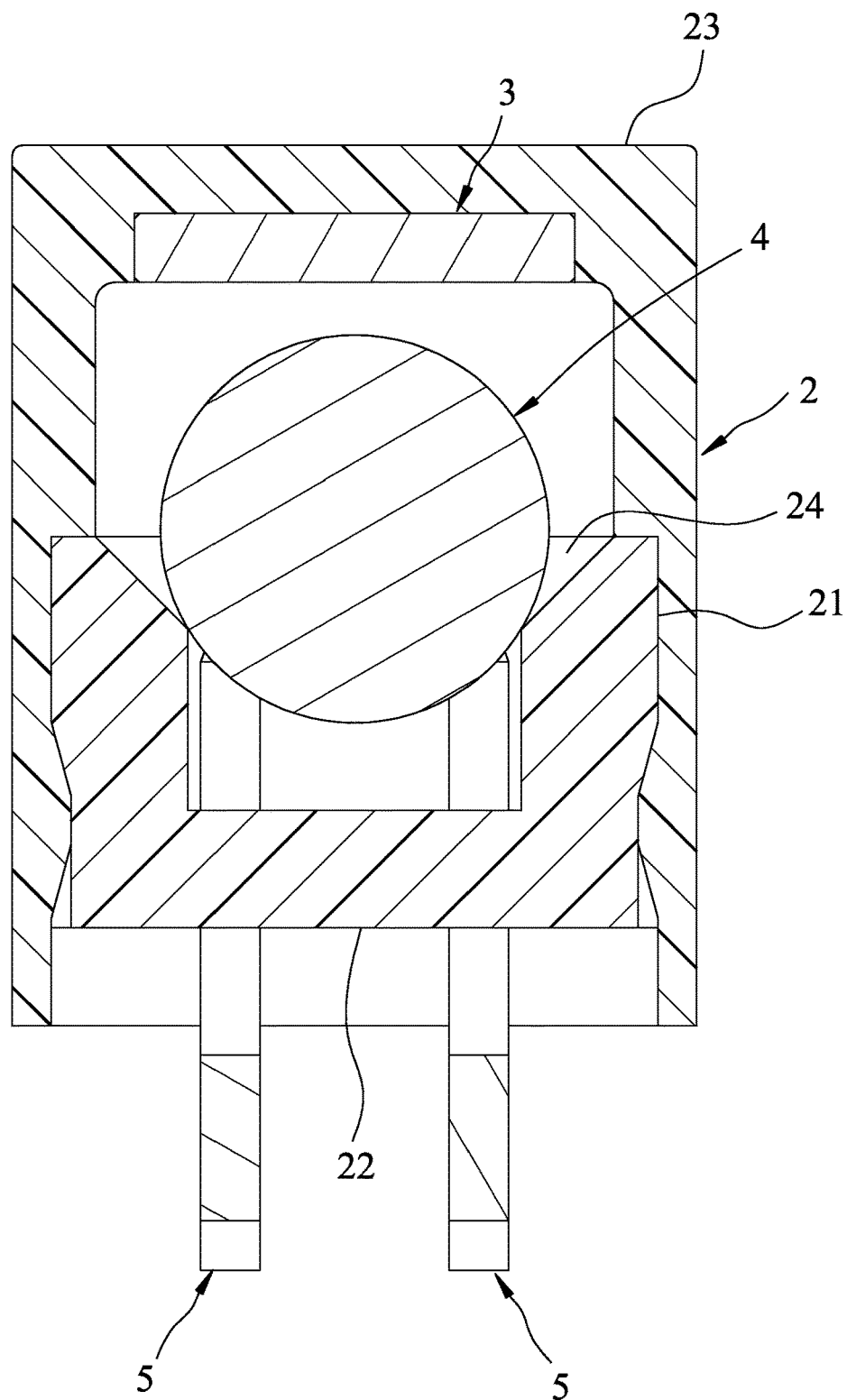
FIG. 24 is a view similar to FIG. 23, but illustrating how a conductive body interconnects conductive terminals when the fourth embodiment is subjected to an impact.

Referring to FIGS. 23 and 24, the fourth embodiment of the multi-directional sensor according to this disclosure is shown to be generally identical to the first embodiment and differs in that the first magnetic component 3 is disposed in an inner surface of the cover body 23, and each of the conductive terminals 5 extends through the bottom wall 22 into the housing space 24 with a part thereof exposed from the housing unit 2 for connection with an external circuit board. Further, the conductive terminals 5 are disposed below the conductive body 4. The diameter of the conductive body 4 is larger than the distance between each two diametrically opposite ones of the conductive terminals 5.

In a normal or non-impact state, the conductive body 4 is magnetically attracted to and abuts against the first magnetic component 3. When the multi-directional sensor is subjected to an impact, wherever is the direction of impact, the conductive body 4 will drop due to gravity and contact the conductive terminals 5, as shown in FIG. 24, so that the conductive terminals 5 are electrically interconnected and a signal can be generated. Thus, by detecting whether the conductive terminals 5 are electrically interconnected, whether the multi-directional sensor is subjected to an impact can be determined.

While the disclosure has been described in connection with what are considered the most practical embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A multi-directional sensor comprising:

a housing unit including a surrounding wall that surrounds an axis and that defines a housing space;

a first magnetic component and a second magnetic component disposed on said housing unit;

a conductive body that is made of an electrically magnetically conductive material, that is disposed in said housing space, and that is magnetically attracted to said first and second magnetic components;

a plurality of spaced-apart electrically conductive terminals surrounding the axis and said conductive body and facing said housing space; and two spaced-apart conductive plates disposed in said housing unit and facing said housing space, the distance between said conductive plates along the axis being larger than the length of said conductive body along the axis;

wherein said conductive body is not in contact with said conductive terminals in a non-impact state;

wherein said housing unit further includes eight first engagement portions, four of which are disposed on a top end surface of said surrounding wall, and the other four of which are disposed on a bottom end surface of said surrounding wall; and wherein said housing unit further includes an upper cover body, a lower cover body, and eight second engagement portions corresponding in position to said first engagement portions, said upper and lower cover bodies cooperating with said surrounding wall to clamp said conductive plates and said first and second magnetic components thereamong, four of said second engagement portions being disposed on said upper cover body, the other four of said second engagement portions being disposed on said lower cover body, and wherein one of said first and second engagement portions is configured as a protrusion, and the other one of said first and second engagement portions is configured as a groove to engage said protrusion.

* * * * *